US011924901B2

(12) United States Patent
Xue et al.

(10) Patent No.: US 11,924,901 B2
(45) Date of Patent: Mar. 5, 2024

(54) WIRELESS COMMUNICATION METHOD AND APPARATUS

(71) Applicant: HUAWEI TECHNOLOGIES CO., LTD., Shenzhen (CN)

(72) Inventors: Juhua Xue, Shanghai (CN); Wuxiao Zhou, Shanghai (CN); Qingquan Luo, Shanghai (CN); Han Zhou, Shanghai (CN)

(73) Assignee: BEJING JINGSHI INTELLECTUAL PROPERTY MANAGEMENT CO., LTD., Beijing (CN)

( * ) Notice: Subject to any disclaimer, the term of this patent is extended or adjusted under 35 U.S.C. 154(b) by 91 days.

(21) Appl. No.: 16/778,105

(22) Filed: Jan. 31, 2020

(65) Prior Publication Data
US 2020/0170065 A1 May 28, 2020

Related U.S. Application Data

(63) Continuation of application No. PCT/CN2018/100878, filed on Aug. 16, 2018.

(30) Foreign Application Priority Data

Nov. 24, 2017 (CN) .......................... 201711189027.X

(51) Int. Cl.
*H04W 76/18* (2018.01)
*H04W 72/0453* (2023.01)
(Continued)

(52) U.S. Cl.
CPC ....... *H04W 76/18* (2018.02); *H04W 72/0453* (2013.01); *H04W 72/23* (2023.01); *H04W 74/0833* (2013.01); *H04W 80/02* (2013.01)

(58) Field of Classification Search
CPC ............... H04W 76/18; H04W 72/042; H04W 72/0453; H04W 74/0833; H04W 80/02; H04W 36/00; H04L 5/00
See application file for complete search history.

(56) References Cited

U.S. PATENT DOCUMENTS

| 9,479,462 B2 | 10/2016 | Sindhu et al. | |
| 2011/0103221 A1* | 5/2011 | Lee | H04L 5/0007 370/216 |

(Continued)

FOREIGN PATENT DOCUMENTS

| CN | 101754494 A | 6/2010 |
| CN | 101938757 A | 1/2011 |

(Continued)

OTHER PUBLICATIONS

U.S. Appl. No. 62/556,917, Specification (Year: 2017).*

(Continued)

*Primary Examiner* — Yu-Wen Chang
(74) *Attorney, Agent, or Firm* — Maier & Maier, PLLC

(57) ABSTRACT

A wireless communication method and apparatus for improving communication failure recovery efficiency. The method is applied to a terminal or a chip used in a terminal, and includes: upon detecting that downlink communication of the first serving cell fails, determining that downlink communication of the second serving cell is normal; sending a communication failure recovery request on an uplink channel of the second serving cell, where the communication failure recovery request is used to request to recover from a downlink communication failure of the first serving cell; and detecting a communication failure recovery response on a downlink channel of the second serving cell, (Continued)

where the communication failure recovery response is used to indicate a downlink communication resource of the first serving cell.

23 Claims, 10 Drawing Sheets

(51) Int. Cl.
  *H04W 72/23* (2023.01)
  *H04W 80/02* (2009.01)

(56) References Cited

U.S. PATENT DOCUMENTS

| | | | |
|---|---|---|---|
| 2011/0317552 A1* | 12/2011 | Lee | H04L 5/001 370/228 |
| 2012/0314566 A1 | 12/2012 | Lee et al. | |
| 2013/0183974 A1 | 7/2013 | Johansson et al. | |
| 2014/0198768 A1 | 7/2014 | Hahn et al. | |
| 2015/0009802 A1* | 1/2015 | Wager | H04W 76/18 370/218 |
| 2016/0007243 A1 | 1/2016 | Park et al. | |
| 2016/0007403 A1* | 1/2016 | Futaki | H04W 4/30 370/338 |
| 2016/0242224 A1 | 8/2016 | Liu et al. | |
| 2016/0255552 A1* | 9/2016 | Uchino | H04W 36/36 370/329 |
| 2016/0316508 A1 | 10/2016 | Hong et al. | |
| 2017/0171903 A1* | 6/2017 | Kubota | H04W 48/16 |
| 2017/0332287 A1 | 11/2017 | Sethi et al. | |
| 2018/0302889 A1* | 10/2018 | Guo | H04B 7/088 |
| 2019/0037604 A1* | 1/2019 | Akkarakaran | H04W 74/006 |
| 2019/0052339 A1* | 2/2019 | Zhou | H04B 17/17 |
| 2019/0058519 A1* | 2/2019 | Davydov | H04W 72/21 |
| 2019/0081687 A1* | 3/2019 | Sadiq | H04W 76/19 |
| 2019/0089447 A1* | 3/2019 | Sang | H04W 76/19 |
| 2019/0090143 A1* | 3/2019 | Luo | H04W 16/28 |
| 2019/0098661 A1* | 3/2019 | Ye | H04W 74/085 |
| 2020/0106510 A1* | 4/2020 | Song | H04W 76/11 |
| 2020/0178134 A1* | 6/2020 | Yang | H04W 36/00837 |
| 2020/0228185 A1* | 7/2020 | Tao | H04B 7/0695 |
| 2020/0344019 A1* | 10/2020 | Da Silva | H04L 5/0048 |
| 2020/0344834 A1* | 10/2020 | Harada | H04W 76/38 |
| 2020/0374960 A1* | 11/2020 | Deenoo | H04W 72/14 |
| 2020/0404638 A1* | 12/2020 | Deogun | H04L 5/0053 |
| 2021/0076445 A1* | 3/2021 | Tsai | H04L 5/003 |
| 2021/0105171 A1* | 4/2021 | Chen | H04W 72/04 |
| 2021/0185754 A1* | 6/2021 | Da Silva | H04W 76/19 |
| 2021/0204346 A1* | 7/2021 | Ye | H04B 7/00 |

FOREIGN PATENT DOCUMENTS

| | | |
|---|---|---|
| CN | 102143518 A | 8/2011 |
| CN | 102763454 A | 10/2012 |
| CN | 103026753 A | 4/2013 |
| CN | 103188800 A | 7/2013 |
| CN | 103404047 A | 11/2013 |
| CN | 103828481 A | 5/2014 |
| CN | 104038955 A | 9/2014 |
| CN | 104219787 A | 12/2014 |
| CN | 104468029 A | 3/2015 |
| CN | 104581998 A | 4/2015 |
| CN | 105338653 A | 2/2016 |
| CN | 105684491 A | 6/2016 |
| CN | 106792948 A | 5/2017 |
| WO | 2017119247 A1 | 7/2017 |
| WO | 2019087360 A1 | 5/2019 |

OTHER PUBLICATIONS

U.S. Appl. No. 62/587,210,Specification (Year: 2017).*
R2-1704646 Discussion on beam link failure (Year: 2017).*
U.S. Appl. No. 62/543,222,Specification,filed Aug. 9, 2017 (Year: 2017).*
Pantech, "Reestablishment in dual connectivity", GPP TSG-RAN WG2 Meeting #85bis, R2-141382, Mar. 31-Apr. 4, 2014, total 6 pages, Valencia, Spain.
Broadcom Corporation, "Mobility for dual connectivity", 3GPP TSG RAN WG2 Meeting #81 bis, R2-130990, Apr. 15-19, 2013, total 6 pages, Chicago, USA.
Ericsson, "Basic beam recovery", 3GPP TSG RAN WG1 Meeting 90bis, R1-1718434, Oct. 9-13, 2017, total 8 pages, Prague, CZ, XP051341616.
Huawei et al., "Design of PRACH-based beam failure recovery", 3GPP TSG RAN WG1 Meeting #91, R1-1719808, Nov. 27-Dec. 1, 2017, total 5 pages, Reno, USA, XP051369548.
Huawei et al., "Beam Failure Recovery Design Details", 3GPP TSG RAN WG1 Meeting AH NR#3, R1-1715468, Sep. 18-21, 2017, total 10 pages, Nagoya, Japan, XP051338936.
Qualcomm Incorporated, "Beam recovery procedures", 3GPP TSG-RAN WG1 NR#2, R1-1711161, Jun. 27-30, 2017, total 5 pages, Qingdao, P.R. China, XP051300361.
3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14)", 3GPP TS 36.300 V14.4.0 (Sep. 2017), Sep. 2017, total 329 pages.
3GPP, "3rd Generation Partnership Project; Technical Specification Group Radio Access Network; NR; NR and NG-RAN Overall Description; Stage 2 (Release 15)", 3GPP TS 38.300 V1.2.1 (Nov. 2017), Nov. 2017, total 61 pages.
ZTE, "Discussion on mechanism to recovery from beam failure", 3GPP TSG RAN WG1 Meeting #90, R1-1712300, Aug. 21-25, 2017, total 9 pages, Prague, Czechia.
NTT Docomo, Inc., "Further views on mechanism to recover from beam failure", 3GPP TSG RAN WG1 #90, R1-1713919, Aug. 21-25, 2017, total 6 pages, Prague, Czechia.
Nokia et al., "Beam Recovery in NR", 3GPP TSG-RAN WG1#90, R1-1714251, Aug. 21-25, 2017, total 6 pages, Prague, Czech Republic.
MediaTek Inc., "Offline Discussion on Beam Recovery Mechanism", 3GPP TSG RAN WG1 Meeting #90, R1-1715012, Aug. 21-25, 2017, total 12 pages, Prague, Czech.

* cited by examiner

WIRELESS COMMUNICATION METHOD AND APPARATUS

CROSS-REFERENCE TO RELATED APPLICATIONS

This application is a continuation of International Application No. PCT/CN2018/100878, filed on Aug. 16, 2018, which claims priority to Chinese Patent Application No. 201711189027.X, filed on Nov. 24, 2017. The disclosures of the aforementioned applications are hereby incorporated by reference in their entireties.

TECHNICAL FIELD

Embodiments relate to the field of communications technologies, and in particular, to a wireless communication method and apparatus.

BACKGROUND

To provide a higher service rate, a concept of carrier aggregation (CA) is introduced into a third generation partnership project (3GPP). CA can allow for aggregation of a plurality of contiguous or non-contiguous carriers into a larger bandwidth. Carriers that participate in CA and that correspond to different serving cells are referred to as component carriers (CC). At present, a CA-capable terminal may be connected to a plurality of serving cells, and each serving cell corresponds to one CC.

In a new radio (NR) system, carriers may be classified into low-frequency carriers and high-frequency carriers. CCs participating in CA may be all low-frequency carriers, all high-frequency carriers, or include both a low-frequency carrier and a high-frequency carrier. A terminal needs to perform beam management on the high-frequency carrier. For the high-frequency carrier in the NR system, due to movement or rotation of the terminal, obstruction of an object, a surrounding environment change during communication, and the like, quality of communication between a base station and the terminal is usually affected, and even communication over a beam pair link between the base station and the terminal is interrupted.

At present, when a base station and a terminal communicate with each other over a beam pair link on a carrier, if a communication failure occurs on the beam pair link, the terminal re-identifies candidate beam information on the carrier, and recovers communication between the terminal and the base station by using the identified candidate beam information. However, communication on the carrier used between the base station and the terminal is currently interrupted, and the terminal may attempt, for a plurality of times, to directly recover communication between the terminal and the base station on the carrier by using the identified candidate beam information. As a result, this causes a long loopback time, and is unfavorable to fast communication failure recovery.

SUMMARY

Embodiments provide a wireless communication method and apparatus, to improve communication failure recovery efficiency.

To achieve the foregoing objective, the following technical solutions are used in the embodiments.

According to a first aspect, a wireless communication method is provided. The method is applied to a terminal or a chip used in a terminal, a base station provides a CA service for the terminal by using at least two serving cells, the at least two serving cells include a first serving cell and a second serving cell, and the method includes: when detecting that downlink communication of the first serving cell fails, determining that downlink communication of the second serving cell is normal; sending a communication failure recovery request on an uplink channel of the second serving cell, where the communication failure recovery request is used to request to recover from a downlink communication failure of the first serving cell; and detecting a communication failure recovery response on a downlink channel of the second serving cell, where the communication failure recovery response is used to indicate a downlink communication resource of the first serving cell.

In the foregoing aspect, when the terminal detects that the downlink communication failure occurs in the first serving cell, the terminal determines that the downlink communication of the second serving cell is normal, sends the communication failure recovery request of the first serving cell on the uplink channel of the second serving cell, and detects the communication failure recovery response on the downlink channel of the second serving cell. This can improve a communication failure recovery success rate, and further implement fast communication failure recovery. In addition, because the second serving cell is a serving cell in normal communication, the terminal does not need to perform beam sweeping to obtain candidate beam information, thereby saving a beam sweeping time.

In a possible implementation of the first aspect, before sending a communication failure recovery request, the method further includes: receiving failure recovery request configuration information from the base station, where the failure recovery request configuration information is used to indicate the uplink channel on which the communication failure recovery request is sent, and the uplink channel is one of the following channels: a physical uplink control channel (PUCCH), a physical random access channel (PRACH), and a physical uplink shared channel (PUSCH). In a possible implementation, the base station configures, for the terminal, the uplink channel on which the communication failure recovery request is sent, so that the terminal may send the communication failure recovery request on the configured uplink channel, thereby increasing a success rate of detecting the communication failure recovery request by the base station.

In a possible implementation of the first aspect, when the uplink channel on which the communication failure recovery request is sent is the PUSCH, the communication failure recovery request carried on the PUSCH is carried in a media access control layer control element (MAC-CE). In a possible implementation, the method for carrying the communication failure recovery request on the uplink channel of the second serving cell is provided. Because a relatively large amount of data is carried on the PUSCH, the terminal sends the communication failure recovery request on the PUSCH. This can reduce signaling interaction between the terminal and the base station.

In a possible implementation of the first aspect, when the communication failure recovery request carried on the PUSCH is carried in the element MAC-CE, the MAC-CE includes a MAC (media access control) request indication and the communication failure recovery request, and the MAC request indication is used to indicate that a payload in the current MAC-CE is the communication failure recovery request. In a possible implementation, the terminal may indicate, to the base station by using the MAC request indication, that the payload in the current MAC-CE is the communication failure recovery request. This can reduce signaling interaction between the terminal and the base station.

In a possible implementation of the first aspect, the terminal includes a MAC layer and a physical layer, and sending a communication failure recovery request on an uplink channel of the second serving cell includes: packetizing, by the terminal, the MAC request indication and the communication failure recovery request at the MAC layer, to obtain a MAC-CE data packet; and sending, by the terminal, the data packet on the PUSCH of the second serving cell at the physical layer. In a possible implementation, the terminal may determine, based on a MAC response indication obtained through depacketization, that a payload in the current MAC-CE is the communication failure recovery response. This can reduce signaling interaction between the terminal and the base station.

In a possible implementation of the first aspect, sending a communication failure recovery request on an uplink channel of the second serving cell includes: sending, by the terminal, a data packet on the uplink channel of the second serving cell, where the data packet includes indication information of the communication failure recovery request, and the indication information is used to indicate that the data packet includes the communication failure recovery request. In a possible implementation, the method for carrying the communication failure recovery request on the uplink channel of the second serving cell is provided. Because a relatively large amount of data is carried on the PUSCH, the terminal sends the communication failure recovery request on the PUSCH. This can reduce signaling interaction between the terminal and the base station.

In a possible implementation of the first aspect, before detecting a communication failure recovery response, the method further includes: receiving failure recovery response configuration information from the base station, where the failure recovery response configuration information is used to indicate the downlink channel on which the communication failure recovery response is detected, and the downlink channel is one of the following channels: a physical downlink control channel and a physical downlink shared channel. In a possible implementation, the base station configures, for the terminal, the downlink channel on which the communication failure recovery response is detected, so that the terminal may detect the communication failure recovery response on the configured downlink channel, thereby increasing a success rate of detecting the communication failure recovery response by the terminal.

In a possible implementation of the first aspect, when the downlink channel on which the communication failure recovery response is detected is the physical downlink shared channel, the communication failure recovery response carried on the physical downlink shared channel is carried in the MAC-CE. In a possible implementation, the method for carrying the communication failure recovery request on the uplink channel of the second serving cell is provided. Because a relatively large amount of data is carried on the PUSCH, the terminal sends the communication failure recovery request on the PUSCH. This can reduce signaling interaction between the terminal and the base station.

In a possible implementation of the first aspect, when the communication failure recovery response carried on the physical downlink shared channel is carried in the MAC-CE, the MAC-CE includes a MAC response indication and the communication failure recovery response. The MAC response indication is used to indicate that a payload in the current MAC-CE is the communication failure recovery response.

In a possible implementation of the first aspect, the terminal includes a MAC layer and a physical layer, and detecting a communication failure recovery response on a downlink channel of the second serving cell includes: detecting, by the terminal, a data packet from the base station on the physical downlink shared channel of the second serving cell at the physical layer; and depacketizing, by the terminal, the data packet at the MAC layer, and determining the communication failure recovery response based on the MAC response indication obtained through depacketization.

In a possible implementation of the first aspect, detecting a communication failure recovery response on a downlink channel of the second serving cell includes: detecting a data packet from the base station on the downlink channel of the second serving cell, where the data packet includes indication information of the communication failure recovery response, and the indication information is used to indicate that the data packet includes the communication failure recovery response. In a possible implementation, the method for carrying the communication failure recovery response on the uplink channel of the second serving cell is provided. Because a relatively large amount of data is carried on the physical downlink shared channel, the base station adds the communication failure recovery response to the physical downlink shared channel. This can reduce signaling interaction between the terminal and the base station.

In a possible implementation of the first aspect, the second serving cell further meets at least one of the following conditions: an index of the second serving cell is the smallest, channel quality of a downlink channel of the second serving cell is the best, and a carrier frequency corresponding to the second serving cell is the lowest. In a possible implementation, after a serving cell in normal communication is determined, the second serving cell that meets a condition is further determined. This can further improve communication failure recovery efficiency and increase a communication failure recovery success rate.

In a possible implementation of the first aspect, the method further includes: when detecting that downlink communication of all the at least two serving cells fails, determining that the second serving cell meets at least one of the following conditions: an index of the second serving cell is the smallest, channel quality of a downlink channel of the second serving cell is the best, and a carrier frequency corresponding to the second serving cell is the lowest. In a possible implementation, when detecting that downlink communication of all of the at least two serving cells fails, the second serving cell that meets a condition is selected. This can further improve communication failure recovery efficiency and further increase a communication failure recovery success rate.

In a possible implementation of the first aspect, the communication failure recovery request includes an index of the first serving cell and a candidate reference signal resource indication of the first serving cell, the candidate reference signal resource indication may also be referred to as candidate beam information, and the candidate reference signal resource indication is used to represent a candidate reference signal port.

In a possible implementation of the first aspect, the communication failure recovery response includes the index of the first serving cell and a target reference signal resource indication of the first serving cell, namely, a reference signal resource indication selected by the base station from the candidate reference signal resource indication. The target reference signal resource indication may also be referred to as downlink beam information, and the target reference signal resource indication is used to represent a target reference signal port.

According to a second aspect, a wireless communication method is provided. The method is applied to a base station or a chip used in a base station, the base station provides a CA service for a terminal by using at least two serving cells, the at least two serving cells include a first serving cell and a second serving cell, and the method includes: receiving a communication failure recovery request from the terminal on an uplink channel of the second serving cell, where the communication failure recovery request is used to request to recover from a downlink communication failure of the first serving cell; generating a communication failure recovery response, where the communication failure recovery response is used to indicate a downlink communication resource of the first serving cell; and sending the communication failure recovery response to the terminal on a downlink channel of the second serving cell.

In a possible implementation of the second aspect, before receiving a communication failure recovery request from the terminal, the method further includes: sending failure recovery request configuration information to the terminal, where the failure recovery request configuration information is used to indicate the uplink channel on which the communication failure recovery request is sent, and the uplink channel is one of the following channels: a PUCCH, a PRACH, and a PUSCH.

In a possible implementation of the second aspect, when it is indicated that the uplink channel on which the communication failure recovery request is sent is the PUSCH, the communication failure recovery request carried on the PUSCH is carried in a MAC-CE.

In a possible implementation of the second aspect, when the communication failure recovery request carried on the PUSCH is carried in the MAC-CE, the MAC-CE includes a MAC request indication and the communication failure recovery request, and the MAC request indication is used to indicate that a payload in the current MAC-CE is the communication failure recovery request.

In a possible implementation of the second aspect, the base station includes a MAC layer and a physical layer, and receiving a communication failure recovery request from the terminal on an uplink channel of the second serving cell includes: receiving, by the base station, a data packet from the terminal on the PUSCH of the second serving cell at the physical layer; and depacketizing, by the base station, the data packet at the MAC layer, and determining the communication failure recovery request based on the MAC request indication obtained through depacketization.

In a possible implementation of the second aspect, receiving a communication failure recovery request from the terminal on an uplink channel of the second serving cell includes: receiving a data packet from the terminal on the uplink channel of the second serving cell, where the data packet includes indication information of the communication failure recovery request, and the indication information is used to indicate that the data packet includes the communication failure recovery request, so that it is determined, based on the indication information, that the data packet includes the communication failure recovery request. In a possible implementation, the method for carrying the communication failure recovery request on the uplink channel of the second serving cell is provided. Because a relatively large amount of data is carried on the PUSCH, the terminal sends the communication failure recovery request on the PUSCH. This can reduce signaling interaction between the terminal and the base station.

In a possible implementation of the second aspect, before sending the communication failure recovery response to the terminal, the method further includes: sending failure recovery response configuration information to the terminal, where the failure recovery response configuration information is used to indicate the downlink channel on which the communication failure recovery response is detected, and the downlink channel is one of the following channels: a physical downlink control channel and a physical downlink shared channel.

In a possible implementation of the second aspect, when it is indicated that the downlink channel on which the communication failure recovery response is detected is the physical downlink shared channel, the communication failure recovery response carried on the physical downlink shared channel is carried in the MAC-CE.

In a possible implementation of the second aspect, when the communication failure recovery response carried on the physical downlink shared channel is carried in the MAC-CE, the MAC-CE includes a MAC response indication and the communication failure recovery response, and the MAC response indication is used to indicate that a payload in the current MAC-CE is the communication failure recovery response.

In a possible implementation of the second aspect, the base station includes a MAC layer and a physical layer, and sending the communication failure recovery response to the terminal on a downlink channel of the second serving cell includes: packetizing, by the base station, the MAC response indication and the communication failure recovery response at the MAC layer, to obtain a MAC-CE data packet; and sending, by the base station, the data packet on the physical downlink shared channel of the second serving cell at the physical layer.

In a possible implementation of the second aspect, sending the communication failure recovery response to the terminal on a downlink channel of the second serving cell includes: sending, by the base station, a data packet on the downlink channel of the second serving cell, where the data packet includes indication information of the communication failure recovery response, and the indication information is used to indicate that the data packet includes the communication failure recovery response, so that the terminal can determine, based on the indication information, that the data packet includes the communication failure recovery response. In a possible implementation, the method for carrying the communication failure recovery response on the downlink channel of the second serving cell is provided. Because a relatively large amount of data is carried on the physical downlink shared channel, the base station sends the communication failure recovery response on the physical downlink shared channel. This can reduce signaling interaction between the terminal and the base station.

In a possible implementation of the second aspect, the second serving cell further meets at least one of the following conditions: an index of the second serving cell is the smallest, channel quality of a downlink channel of the second serving cell is the best, and a carrier frequency corresponding to the second serving cell is the lowest.

In a possible implementation of the second aspect, the communication failure recovery request includes an index of the first serving cell and a candidate reference signal resource indication of the first serving cell, the candidate reference signal resource indication may also be referred to as candidate beam information, and the candidate reference signal resource indication is used to represent a candidate reference signal port.

In a possible implementation of the second aspect, the communication failure recovery response includes the index of the first serving cell and a target reference signal resource indication of the first serving cell, namely, a reference signal resource indication selected by the base station from the candidate reference signal resource indication. The target reference signal resource indication may also be referred to as downlink beam information, and the target reference signal resource indication is used to represent a target reference signal port.

According to a third aspect, a wireless communications apparatus is provided. The wireless communications apparatus is a terminal or is a chip used in a terminal, a base station provides a CA service for the terminal by using at least two serving cells, the at least two serving cells include a first serving cell and a second serving cell, and the wireless communications apparatus includes a function capable of implementing the wireless communication method provided in any one of the first aspect or the possible implementations of the first aspect. The function may be implemented by hardware, or implemented by hardware executing corresponding software. The hardware or the software includes one or more units corresponding to the foregoing function.

In a possible implementation of the third aspect, a structure of the wireless communications apparatus includes a processor and a memory connected to the processor. The memory is configured to store program code, and when the program code is executed by the processor, the wireless communications apparatus is enabled to perform the following steps: when detecting that downlink communication of the first serving cell fails, determining that downlink communication of a second serving cell is normal; sending a communication failure recovery request on an uplink channel of the second serving cell, where the communication failure recovery request is used to request to recover from a downlink communication failure of the first serving cell; and detecting a communication failure recovery response on a downlink channel of the second serving cell, where the communication failure recovery response is used to indicate a downlink communication resource of the first serving cell.

In a possible implementation of the third aspect, before sending a communication failure recovery request, the wireless communications apparatus further performs the following step: receiving failure recovery request configuration information from the base station, where the failure recovery request configuration information is used to indicate the uplink channel on which the communication failure recovery request is sent, and the uplink channel is one of the following channels: a PUCCH, a PRACH, and a PUSCH.

In a possible implementation of the third aspect, when the uplink channel on which the communication failure recovery request is sent is the PUSCH, the communication failure recovery request carried on the PUSCH is carried in a MAC-CE.

In a possible implementation of the third aspect, when the communication failure recovery request carried on the PUSCH is carried in the MAC-CE, the MAC-CE includes a MAC request indication and the communication failure recovery request, and the MAC request indication is used to indicate that a payload in the current MAC-CE is the communication failure recovery request.

In a possible implementation of the third aspect, the wireless communications apparatus includes a MAC layer and a physical layer, and the wireless communications apparatus further performs the following steps: packetizing the MAC request indication and the communication failure recovery request at the MAC layer, to obtain a MAC-CE data packet; and sending the data packet on the PUSCH of the second serving cell at the physical layer.

In a possible implementation of the third aspect, the wireless communications apparatus further performs the following step: sending a data packet on the uplink channel of the second serving cell, where the data packet includes indication information of the communication failure recovery request, and the indication information is used to indicate that the data packet includes the communication failure recovery request.

In a possible implementation of the third aspect, before detecting a communication failure recovery response, the wireless communications apparatus further performs the following step: receiving failure recovery response configuration information from the base station, where the failure recovery response configuration information is used to indicate the downlink channel on which the communication failure recovery response is detected, and the downlink channel is one of the following channels: a physical downlink control channel and a physical downlink shared channel.

In a possible implementation of the third aspect, when the downlink channel on which the communication failure recovery response is detected is the physical downlink shared channel, the communication failure recovery response carried on the physical downlink shared channel is carried in the MAC-CE.

In a possible implementation of the third aspect, when the communication failure recovery response carried on the physical downlink shared channel is carried in the MAC-CE, the MAC-CE includes a MAC response indication and the communication failure recovery response, and the MAC response indication is used to indicate that a payload in the current MAC-CE is the communication failure recovery response.

In a possible implementation of the third aspect, the wireless communications apparatus includes a MAC layer and a physical layer, and the wireless communications apparatus further performs the following steps: detecting a data packet from the base station on the physical downlink shared channel of the second serving cell at the physical layer; and depacketizing the data packet at the MAC layer, and determining the communication failure recovery response based on the MAC response indication obtained through depacketization.

In a possible implementation of the third aspect, the wireless communications apparatus further performs the following step: detecting a data packet from the base station on the downlink channel of the second serving cell, where the data packet includes indication information of the communication failure recovery response, and the indication information is used to indicate that the data packet includes the communication failure recovery response.

In a possible implementation of the third aspect, the second serving cell further meets at least one of the following conditions: an index of the second serving cell is the smallest, channel quality of a downlink channel of the second serving cell is the best, and a carrier frequency corresponding to the second serving cell is the lowest.

In a possible implementation of the third aspect, the wireless communications apparatus further performs the following step: when detecting that downlink communication of all the at least two serving cells fails, determining that the second serving cell meets at least one of the following conditions: an index of the second serving cell is the smallest, channel quality of a downlink channel of the second serving cell is the best, and a carrier frequency corresponding to the second serving cell is the lowest.

According to a fourth aspect, a wireless communications apparatus is provided. The wireless communications apparatus may be a base station or a chip used in a base station, and the wireless communications apparatus includes a function capable of implementing the wireless communication method provided in any one of the second aspect or the possible implementations of the second aspect. The function may be implemented by hardware, or implemented by hardware executing corresponding software. The hardware or the software includes one or more units corresponding to the foregoing function.

In a possible implementation of the fourth aspect, the wireless communications apparatus is a base station or a chip used in a base station, the base station provides a CA service for a terminal by using at least two serving cells, the at least two serving cells include a first serving cell and a second serving cell, and a structure of the wireless communications apparatus includes a processor and a memory connected to the processor. The memory is configured to store program code, and when the program code is executed by the processor, the wireless communications apparatus is enabled to perform the following steps: receiving a communication failure recovery request from the terminal on an uplink channel of the second serving cell, where the communication failure recovery request is used to request to recover from a downlink communication failure of the first serving cell; generating a communication failure recovery response, where the communication failure recovery response is used to indicate a downlink communication resource of the first serving cell; and sending the communication failure recovery response to the terminal on a downlink channel of the second serving cell.

In a possible implementation of the fourth aspect, the wireless communications apparatus further performs the following step: sending failure recovery request configuration information to the terminal, where the failure recovery request configuration information is used to indicate the uplink channel on which the communication failure recovery request is sent, and the uplink channel is one of the following channels: a PUCCH, a PRACH, and a PUSCH.

In a possible implementation of the fourth aspect, when it is indicated that the uplink channel on which the communication failure recovery request is sent is the PUSCH, the communication failure recovery request carried on the PUSCH is carried in a MAC-CE.

In a possible implementation of the fourth aspect, when the communication failure recovery request carried on the PUSCH is carried in the MAC-CE, the MAC-CE includes a MAC request indication and the communication failure recovery request, and the MAC request indication is used to indicate that a payload in the current MAC-CE is the communication failure recovery request.

In a possible implementation of the fourth aspect, the wireless communications apparatus includes a MAC layer and a physical layer, and the wireless communications apparatus further performs the following steps: receiving a data packet from the terminal on the PUSCH of the second serving cell at the physical layer; and depacketizing the data packet at the MAC layer, and determining the communication failure recovery response based on the MAC request indication obtained through depacketization.

In a possible implementation of the fourth aspect, the wireless communications apparatus further performs the following steps: receiving a data packet from the terminal on the uplink channel of the second serving cell, where the data packet includes indication information of the communication failure recovery request, and the indication information is used to indicate that the data packet includes the communication failure recovery request, so that it is determined, based on the indication information, that the data packet includes the communication failure recovery request.

In a possible implementation of the fourth aspect, the wireless communications apparatus further performs the following step: sending failure recovery response configuration information to the terminal, where the failure recovery response configuration information is used to indicate the downlink channel on which the communication failure recovery response is detected, and the downlink channel is one of the following channels: a physical downlink control channel and a physical downlink shared channel.

In a possible implementation of the fourth aspect, when it is indicated that the downlink channel on which the communication failure recovery response is detected is the physical downlink shared channel, the communication failure recovery response carried on the physical downlink shared channel is carried in the MAC-CE.

In a possible implementation of the fourth aspect, when the communication failure recovery response carried on the physical downlink shared channel is carried in the MAC-CE, the MAC-CE includes a MAC response indication and the communication failure recovery response, and the MAC response indication is used to indicate that a payload in the current MAC-CE is the communication failure recovery response.

In a possible implementation of the fourth aspect, the wireless communications apparatus includes a MAC layer and a physical layer, and the wireless communications apparatus further performs the following steps: packetizing the MAC response indication and the communication failure recovery response at the MAC layer, to obtain a MAC-CE data packet; and sending the data packet on the PUSCH of the second serving cell at the physical layer.

In a possible implementation of the fourth aspect, the wireless communications apparatus further performs the following step: sending a data packet on the downlink channel of the second serving cell, where the data packet includes indication information of the communication failure recovery response, and the indication information is used to indicate that the data packet includes the communication failure recovery response, so that the terminal may determine, based on the indication information, that the data packet includes the communication failure recovery response.

In a possible implementation of the fourth aspect, the second serving cell further meets at least one of the following conditions: an index of the second serving cell is the smallest, channel quality of a downlink channel of the second serving cell is the best, and a carrier frequency corresponding to the second serving cell is the lowest.

According to a fifth aspect, a computer-readable storage medium is provided. The computer-readable storage medium stores an instruction, and when the instruction is run on a computer, the computer is enabled to perform the wireless communication method provided in any one of the first aspect or the possible implementations of the first aspect.

According to a sixth aspect, a computer-readable storage medium is provided. The computer-readable storage medium stores an instruction. When the instruction is run on a computer, the computer is enabled to perform the wireless communication method provided in any one of the second aspect or the possible implementations of the second aspect.

According to a seventh aspect, a computer program product including an instruction is provided. When the computer program product is run on a computer, the computer is enabled to perform the wireless communication method provided in any one of the first aspect or the possible implementations of the first aspect.

According to an eighth aspect, a computer program product is provided. When the computer program product is run on a computer, the computer is enabled to perform the wireless communication method provided in any one of the second aspect or the possible implementations of the second aspect.

According to a ninth aspect, a communications system is provided. The communications system includes a terminal and a base station. The base station provides a CA service for the terminal by using at least two serving cells, and the at least two serving cells include a first serving cell and a second serving cell. The terminal may be the terminal provided in the foregoing aspects, and is configured to support the terminal in performing the wireless communication method provided in any one of the first aspect or the possible implementations of the first aspect; and/or the base station is the base station provided in the foregoing aspects, and is configured to support the base station in performing the wireless communication method provided in any one of the second aspect or the possible implementations of the second aspect.

It may be understood that any one of the apparatus of the wireless communication method, the computer storage medium, or the computer program product provided above is configured to perform the corresponding method provided above. Therefore, for beneficial effects of the apparatus, the computer storage medium, or the computer program product, refer to the beneficial effects in the corresponding method provided above. Details are not described herein again.

DESCRIPTION OF EMBODIMENTS

Figure 1:
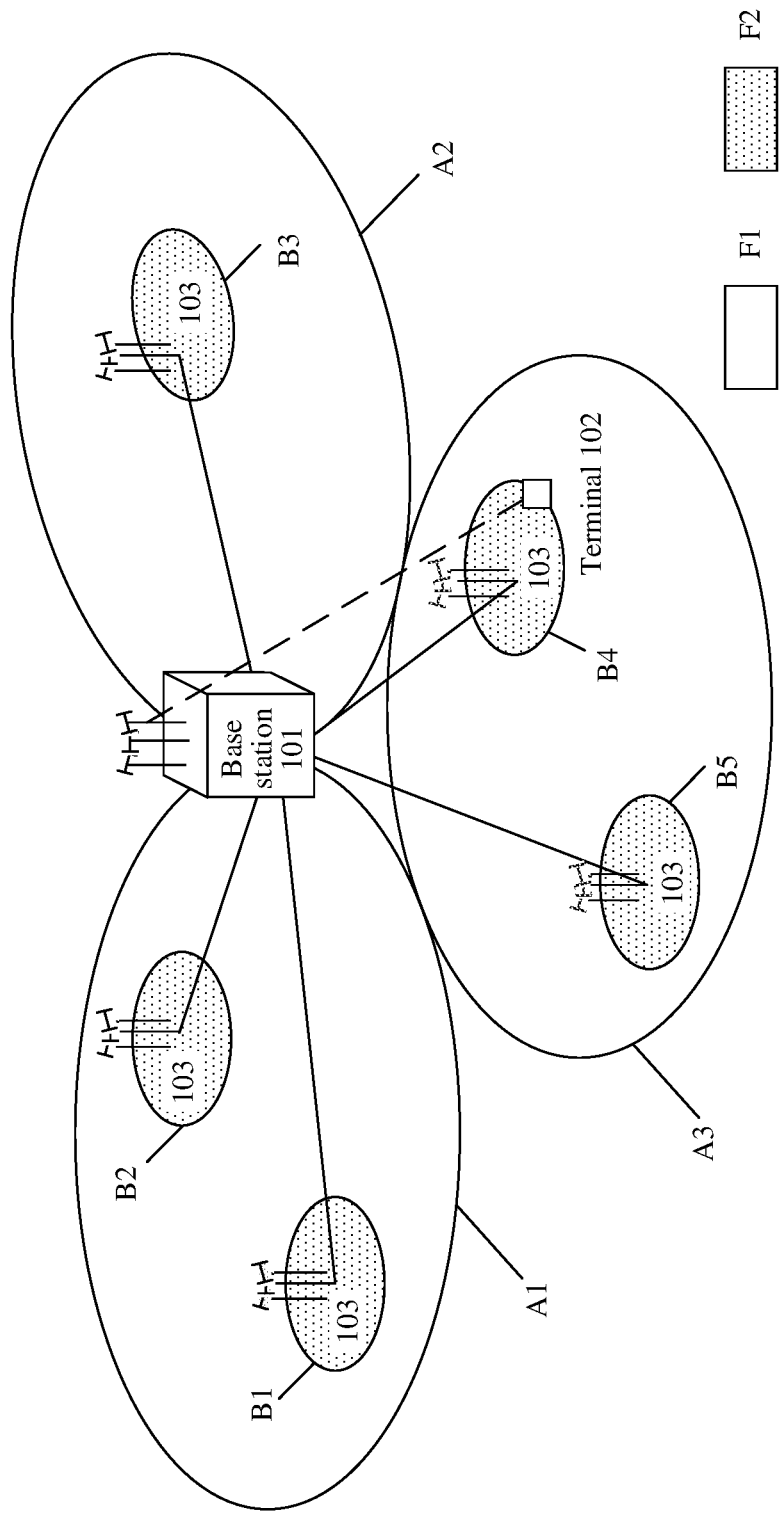
FIG. 1 is a schematic structural diagram of a communications system according to an embodiment.

To provide a higher service rate, a concept of carrier aggregation (CA) is introduced into 3GPP. CA allows for bandwidth aggregation of a plurality of contiguous or non-contiguous carriers into a larger bandwidth. For example, two carriers each with a bandwidth of 20 MHz may be aggregated into a bandwidth of 40 MHz. Carriers that participate in CA and that correspond to different cells may be referred to as component carriers (CC). A CA-capable terminal may be connected to a plurality of serving cells, and a quantity of the plurality of serving cells that may be connected to the terminal may be determined according to both a 3GPP protocol and a capability of the terminal. After the terminal initiates and successfully establishes a radio resource control (RRC) connection in a serving cell, the serving cell is a serving cell on which the terminal camps, and the serving cell is responsible for RRC communication between a base station and the terminal. The base station may configure another serving cell for the terminal by establishing an RRC connection.

3GPP-defined CA deployment scenarios may include: co-site co-coverage, co-site different coverage, co-site filling coverage holes, co-site different coverage plus remote radio heads (RRH), and co-site different coverage plus repeaters.

The embodiments described herein are applicable to a communications system including any one of the foregoing CA deployment scenarios. The communications system may include a long term evolution (LTE) system, an NR system, and any future communications system. The communications system may include a base station and a terminal, and the terminal may be connected to a plurality of serving cells. The base station may include a macro base station, a micro base station, a NodeB (NB), an eNB (eNode B), a gNB (NR NodeB), and the like. For ease of understanding, these base stations are collectively referred to as a base station in the embodiments provided herein. The terminal may include a mobile phone, user equipment, an electronic device, a mobile terminal, an electronic terminal, a wearable device (such as a smart band or a smartwatch), a console, and the like. For ease of understanding, these terminals are collectively referred to as a terminal in the embodiments provided herein.

For ease of understanding, an NR system is used as an example to describe in detail a communications system including a CA deployment scenario. An available frequency band in the NR system may be divided into two frequency bands. For example, using 6 GHz as a reference, the frequency band is divided into a frequency band lower than 6 GHz and a frequency band higher than 6 GHz. Carriers in the frequency band lower than 6 GHz may be referred to as low-frequency carriers, and carriers in the frequency band higher than 6 GHz may be referred to as high-frequency carriers. A carrier of 6 GHz may belong to a range of the high-frequency carriers or a range of the low-frequency carriers. It can be understood that, in the embodiments provided herein, the low-frequency carriers and the high-frequency carriers are relative concepts, and may be obtained through division according to another reference. A plurality of beams may be configured on one carrier, and a coverage area of the plurality of beams falls within a coverage area of the carrier. In other words, the coverage area of the plurality of beams is a subset of the coverage area of the carrier. The carrier may be a high-frequency carrier or a low-frequency carrier.

When the base station and the terminal communicate with each other on a low-frequency carrier, an omnidirectional antenna or a beamforming antenna may be used for communication. Beamforming means that correlation between units of an antenna is controlled to generate an electromagnetic wave with a directionality, and a direction of the electromagnetic wave is consistent with a direction from the terminal to the base station as much as possible, to increase a signal-to-noise ratio of link transmission between the base station and the terminal. A beam may be understood as a directional electromagnetic wave propagated in free space. For example, the beam may be a reference signal port, and different reference signal ports represent different reference signal configurations, namely, reference signals having different directionalities. In addition, a beam may also be understood as a setting of a transmit antenna or a receive antenna, so that the transmit antenna or the receive antenna can effectively generate or receive the directional electromagnetic wave. For example, the beam may be an antenna port, and different antenna ports have different antenna configurations, so that the directional electromagnetic wave can be effectively generated or received.

When the base station and the terminal communicate with each other on a high-frequency carrier, over a beam configured on the high-frequency carrier, the terminal may send information to the base station or receive information sent by the base station. Similarly, over a beam configured on the high-frequency carrier, the base station may also receive information sent by the terminal or send information to the terminal. In one embodiment, it is assumed that the terminal uses a beam 1 to a beam 3 and the base station uses a beam 4 to a beam 6 on a carrier. If the terminal sends information to the base station by using the beam 1, and the base station receives, by using the beam 4, the information sent by the terminal, the beam 1 and the beam 4 may be referred to as a beam pair. The beam pair herein may be a pair of beams used by two communication parties for information transmission and reception. When the terminal and the base station communicate with each other by using the beam 1 and the beam 4, respectively, a link of the beam 1 or the beam 4 may be referred to as a beam link. The beam link herein may be a link of a single beam for communication, and a beam pair link may be a link of a beam pair used for information transmission and reception between two communication parties. When the base station and the terminal communicate with each other by using a beam, the base station and the terminal need to support a beamforming technology. The beamforming technology may be used to improve a signal-to-noise ratio of link transmission between the base station and the terminal, thereby increasing a system capacity.

FIG. 1 is a diagram of a system architecture of an NR system including a CA deployment scenario according to an embodiment. A CA deployment scenario of co-site different coverage plus RRHs in the NR system is used as an example for description. The NR system includes a base station 101, a terminal 102, and RRHs 103. A plurality of antenna arrays are disposed on the base station 101, some antenna arrays are directly deployed on the base station 101, and some antenna arrays are remotely deployed by using the RRHs 103. In FIG. 1, for example, CCs participating in CA include a first carrier and a second carrier. It is assumed that a carrier frequency of the first carrier is lower than a carrier frequency of the second carrier. The first carrier performs radiation by using the antenna array directly deployed on the base station 101, and the second carrier performs radiation by using the remotely deployed antenna array. A coverage area of a serving cell corresponding to the first carrier may include A1, A2, and A3, and a coverage area of a serving cell corresponding to the second carrier may include B1, B2, B3, B4, and B5.

The terminal 102 may camp on the serving cell corresponding to the first carrier, that is, may be located in A1, A2, or A3 in FIG. 1. Alternatively, the terminal 102 may camp on the cell corresponding to the second carrier, that is, may be located in B1, B2, B3, B4, or B5 in FIG. 1. The base station 101 and the terminal 102 may communicate with each other by using a beam configured on the first carrier, or may communicate with each other by using a beam configured on the second carrier. In one embodiment, it may be contemplated that, when the terminal 102 camps on the cell corresponding to the first carrier, a beam on the first carrier may be used to carry a control channel and a data channel between the base station 101 and the terminal 102, and a beam on the second carrier may also be used to carry a control channel, but only the first carrier carries a PUCCH in the control channel. In this case, if the cell corresponding to the second carrier is in an active state, the beam on the second carrier may be used to carry a data channel; or if the cell corresponding to the second carrier is in an inactive state, the beam on the second carrier cannot be used to carry a data channel. In other words, when the terminal 102 camps on the cell corresponding to the first carrier, if the cell corresponding to the second carrier is in the active state, the beam on the first carrier may be used to send control information (in this case, uplink control information is carried on the PUCCH) and data information between the base station 101 and the terminal 102, and the beam on the second carrier may also be used to send the control information (in this case, the uplink control information is carried on an uplink channel other than the PUCCH) and the data information. When the terminal 102 camps on the serving cell corresponding to the first carrier, if the cell corresponding to the second carrier is in the inactive state, the beam on the first carrier may be used to send control information and data information between the base station 101 and the terminal 102, and the beam on the second carrier is not used to send the data information.

For the NR system including the CA deployment scenario, when CCs participating in CA include a high-frequency carrier, to increase a signal-to-noise ratio of link transmission between the base station and the terminal and increase a system capacity, the terminal needs to perform beam management on each high-frequency carrier. The beam management may mean maintaining uplink and downlink receive/transmit beam pairs. However, for the high-frequency carrier in the NR system, due to movement or rotation of the terminal, obstruction of an object, a surrounding environment change during communication, and the like, quality of communication between the base station and the terminal is affected, and even communication over a beam link in current communication is interrupted. Therefore, when communication interruption occurs on a beam pair link between the base station and the terminal, the terminal needs to perform downlink communication failure recovery.

In the embodiments described herein, the downlink communication failure may mean that signal quality of a downlink channel of a serving cell drops to a sufficiently low level. For example, the signal quality or a signal strength is lower than a specific threshold, or the signal quality or a signal strength is maintained lower than a specific threshold for a period of time. Correspondingly, normal communication may mean that no communication failure occurs in the serving cell. The downlink channel of the serving cell may be all downlink channels of the serving cell except for a data channel, and may include a physical downlink control channel (PDCCH), a channel state information-reference signal (CSI-RS), and a synchronization signal block (SS Block), or may be some downlink channels. That signal quality of a downlink channel of a serving cell drops to a sufficiently low level may mean that signal quality of all of the downlink channels drops to a sufficiently low level, or may mean that signal quality of one or more of the downlink channels drops to a sufficiently low level.

An embodiment provides a wireless communication method, used for single-carrier communication failure recovery. The method may be triggered and performed by a terminal, and may include four phases: detecting a beam failure, identifying a candidate beam, sending a communication failure recovery request, and detecting, by the terminal, a response of a base station to the communication failure recovery request. In one embodiment, when the terminal and the base station communicate with each other by using a single carrier, the terminal may perform beam failure detection on a CSI-RS/SS block carried on the first carrier. When detecting a beam failure, the terminal may perform beam sweeping on the CSI-RS/SS block, to identify the candidate beam. The terminal sends the communication failure recovery request on a PRACH or PUCCH carried on the first carrier. The terminal detects the response of the base station to the communication failure recovery request on a PDCCH carried on the first carrier.

Figure 2:
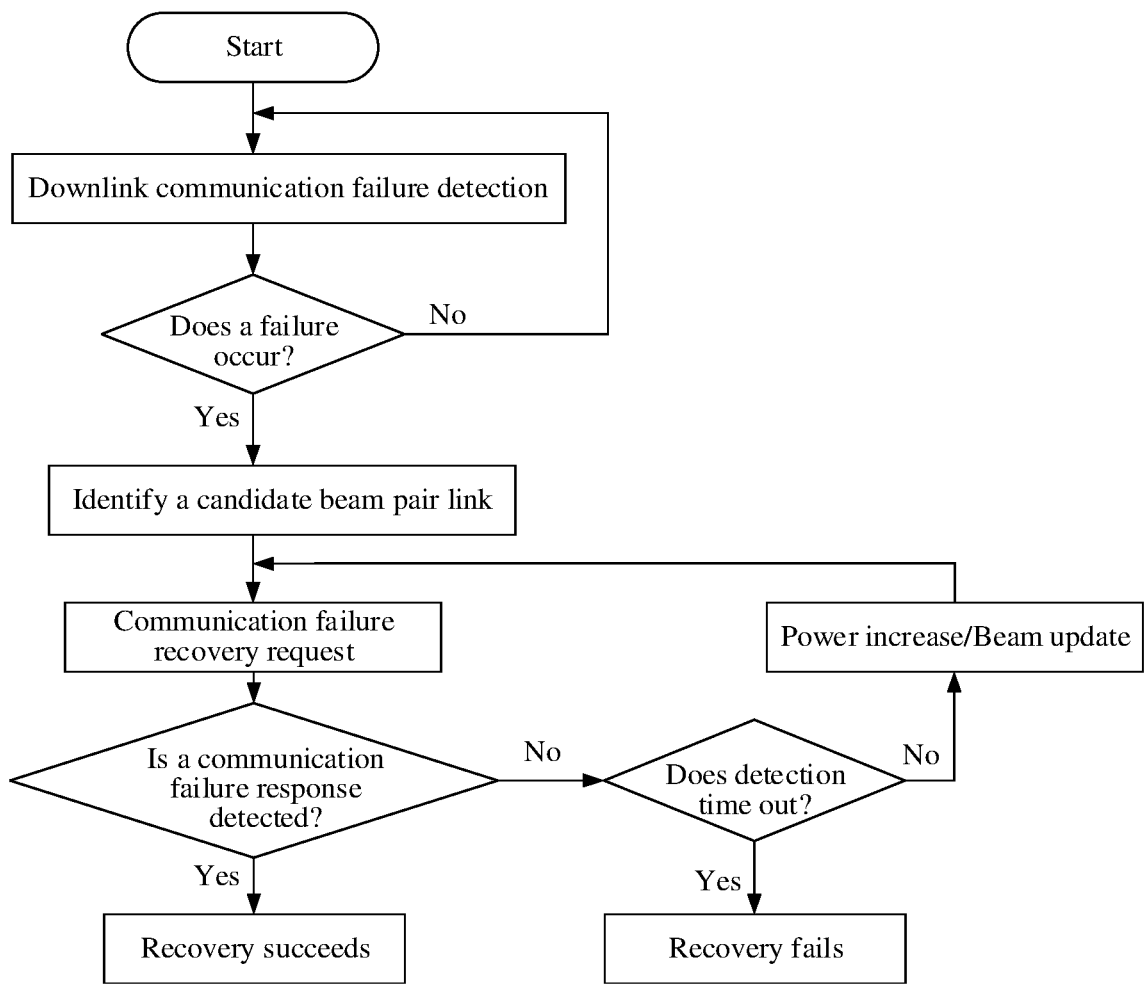
FIG. 2 is a schematic flowchart of a communication failure recovery method according to an embodiment.

For example, a cell on which the terminal currently camps is a serving cell c, and a carrier corresponding to the serving cell c is the first carrier. In the NR system, the foregoing communication failure recovery processing process may be shown in FIG. 2. It is assumed that, on the first carrier, the terminal uses a beam a1 and a beam a2, and the base station uses a beam a3 to a beam a4. The beam a1 and the beam a3 are one beam pair, and the beam a2 and the beam a4 are one beam pair. The terminal uses the beam a1 on the first carrier to carry an uplink channel, where the uplink channel may include a PRACH/PUCCH. The terminal detects a downlink channel by using the beam a2 on the first carrier, where the downlink channel may include a CSI-RS/SS block and a PDCCH.

In one embodiment, when the terminal and the base station normally communicate with each other on the first carrier, the terminal may send uplink control information to the base station by using the beam a1 on the first carrier, and the terminal may detect, by using the beam a2, downlink control information sent by the base station. When the terminal detects a downlink communication failure on the CSI-RS/SS block, the terminal may perform beam sweeping on the first carrier on the CSI-RS/SS block, to identify a candidate beam pair link (for example, on the first carrier, the terminal uses a beam b1 and a beam b2, the base station uses a beam b3 and a beam b4, the beam b1 and the beam b3 are one beam pair, and the beam b2 and the beam b4 are one beam pair). Then, the terminal may send a communication failure recovery request to the base station on the PRACH/PUCCH carried on the beam a1, where the communication failure recovery request includes candidate beam information (for example, the beam b3 and the beam b4). When the base station receives the communication failure recovery request sent by the terminal, the base station may select the beam b3 from the candidate beam information, and send, to the terminal, a communication failure recovery response that carries beam information of the beam b3. The terminal may detect the communication failure recovery response on the PDCCH carried on the beam a2. When detecting the communication failure recovery response, the terminal may determine, based on the beam information of the beam b3 carried in the communication failure recovery response, that the base station uses the beam b3 to send information. Therefore, the terminal receives, by using the beam b1 in the same beam pair, the information sent by the base station. If the terminal detects no communication failure recovery response, and determines that the detection does not time out, the terminal may increase an uplink transmit power, or re-initiate a communication failure recovery request by using another uplink beam. If the terminal detects no communication failure recovery response, and determines that the detection times out, the terminal may determine that the current communication failure recovery fails.

Figure 3:
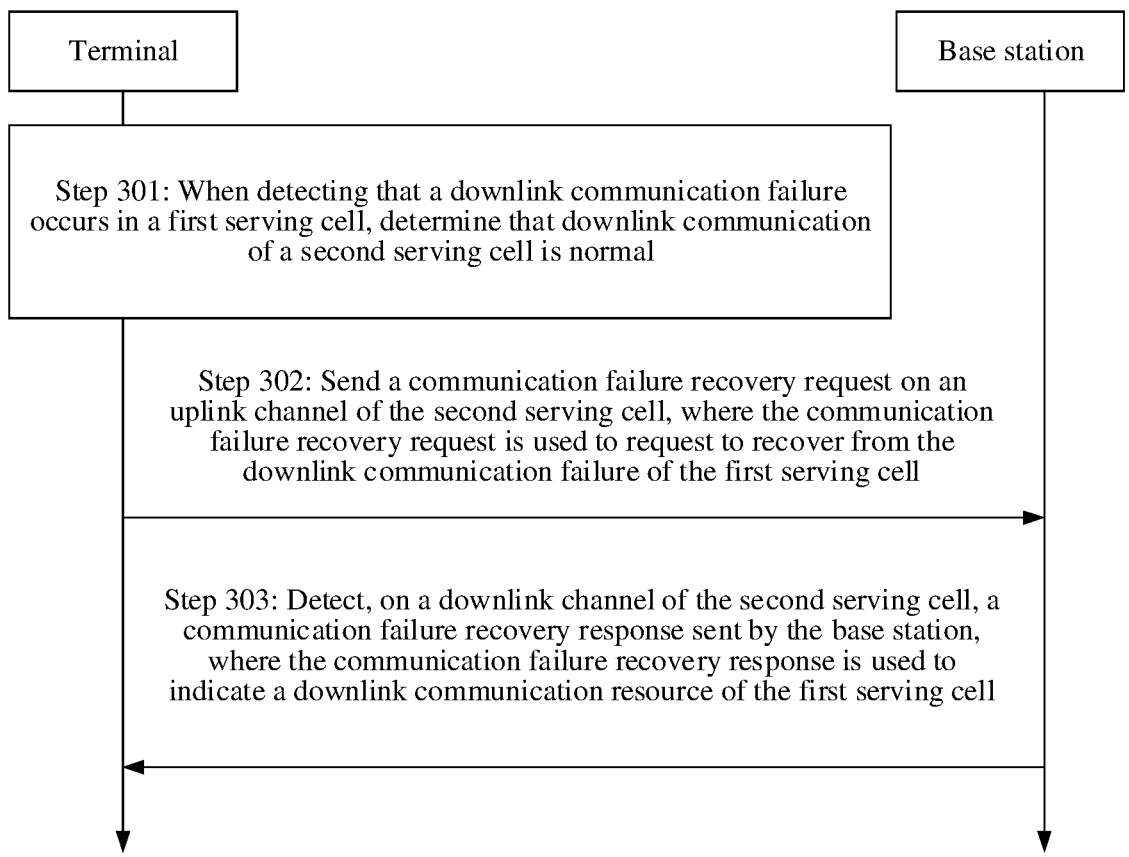
FIG. 3 is a schematic flowchart of a wireless communication method according to an embodiment.

FIG. 3 is a schematic flowchart of a wireless communication method according to an embodiment. The method is applied to a communications system including a terminal and a base station. The base station provides a CA service for the terminal by using at least two serving cells. The at least two serving cells include a first serving cell and a second serving cell. Referring to FIG. 3, the method includes the following steps.

Step 301: When the terminal detects that a downlink communication failure occurs in the first serving cell, the terminal determines that downlink communication of the second serving cell is normal.

CCs participating in CA may include a plurality of carriers. For example, the plurality of carriers include a first carrier and a second carrier, a serving cell corresponding to the first carrier is referred to as the first serving cell, and a serving cell corresponding to the second carrier is referred to as the second serving cell. The first serving cell may be any one of the at least two serving cells in which a downlink communication failure occurs, and the second serving cell may be any one of the at least two serving cells in normal communication. In this embodiment, concepts of a serving cell and a carrier corresponding to the serving cell may be interchangeable. For example, when a carrier corresponding to the first serving cell is the first carrier, the first serving cell that appears hereinafter may be replaced by the first carrier, and the first carrier may also be replaced by the first serving cell.

In addition, when a downlink communication failure occurs in the first serving cell, this may also be understood as a downlink communication failure occurring on the first carrier. A concept of the downlink communication failure may mean that signal quality of a downlink channel of the first serving cell drops to a sufficiently low level. For example, when the terminal detects that signal quality of all downlink channels of the first serving cell drops to a sufficiently low level, the terminal may determine that the downlink communication failure occurs in the first serving cell.

In one embodiment, when the terminal detects that the downlink communication failure occurs in the first serving cell, the terminal may determine, from the at least two serving cells, whether the second serving cell in normal communication exists. If there are a plurality of serving cells in normal communication, the terminal may select any serving cell from the serving cells in normal communication as the second serving cell, or may select, from the serving cells in normal communication, a serving cell that meets a specific condition as the second serving cell. The specific condition that the second serving cell meets may be any one of the following conditions: the second serving cell carries a PUCCH, an index of the second serving cell is the smallest, a carrier frequency corresponding to the second serving cell is the lowest, and downlink channel quality of the second serving cell is the best. Alternatively, the specific condition may be understood as: the second carrier carries a PUCCH, an index of the second serving cell corresponding to the second carrier is the smallest, a carrier frequency of the second carrier is the lowest, and downlink channel quality of the second carrier is the best.

For example, for the specific condition that the second serving cell carries a PUCCH, in a downlink communication failure recovery mechanism, the PUCCH may be used to carry a communication failure recovery request. Therefore, the second serving cell that carries the PUCCH is selected, so that the communication failure recovery request may be directly carried on the PUCCH. This can improve communication failure recovery efficiency of the first serving cell.

For the specific condition that a cell index of the second serving cell is the smallest, generally, a serving cell whose index is the smallest is a serving cell on which the terminal currently camps. The serving cell carries a control channel (for example, a PRACH/PUCCH), and the control channel may be directly used to carry a communication failure recovery request. This can improve communication failure recovery efficiency of the first serving cell.

For the specific condition that a carrier frequency corresponding to the second serving cell is the lowest, a lower carrier frequency corresponds to a larger coverage area, and results in higher information transmission stability. Therefore, selecting the second serving cell with the lowest carrier frequency to recover from the communication failure of the first serving cell can increase a communication failure recovery success rate.

For the specific condition that downlink channel quality of the second serving cell is best, better downlink channel quality indicates higher transmission stability and reliability. Therefore, selecting the second serving cell with the best downlink channel quality to recover from the communication failure of first serving cell can increase a communication failure recovery success rate.

It can be noted that, when the at least two serving cells include three or more serving cells, each of the at least two serving cells that is in normal communication may be referred to as the second serving cell. In other words, the at least two serving cells may include a plurality of second serving cells, and therefore the second serving cell that meets the specific condition may be a second serving cell that is selected from the plurality of second serving cells.

Step 302: the terminal sends a communication failure recovery request on an uplink channel of the second serving cell, where the communication failure recovery request is used to request to recover from the downlink communication failure of the first serving cell.

When the terminal sends the communication failure recovery request on the uplink channel of the second serving cell, the base station may receive the communication failure recovery request on a downlink channel of the second serving cell, and determine that the communication failure recovery request is used to request to recover from the downlink communication failure of the first serving cell.

The uplink channel may include a PUCCH, a PRACH, or a PUSCH used to carry control information. In this embodiment, the terminal may add the communication failure recovery request to any one of the foregoing uplink channels. In such a configuration, the terminal may send the communication failure recovery request to the base station on any one of the foregoing uplink channels, and the base station may receive the communication failure recovery request on a corresponding uplink channel.

In addition, when the terminal sends the communication failure recovery request to the base station on the uplink channel of the second serving cell, the terminal may determine a control channel carried in the second serving cell. If the second serving cell carries the PRACH/PUCCH, the terminal may send the communication failure recovery request to the base station on the PRACH/PUCCH of the second serving cell. In this case, the base station may receive the communication failure recovery request by using the PRACH/PUCCH. If the second serving cell carries a PUCCH, the terminal may send the communication failure recovery request to the base station on the PUCCH of the second serving cell. In this case, the base station may receive the communication failure recovery request on the PUCCH.

In one embodiment, if the second serving cell carries the PRACH, the PUCCH, and the PUSCH, the terminal may preferentially select the PUSCH to send the communication failure recovery request to the base station, and the base station receives the communication failure recovery request on the PUSCH. If the second serving cell carries both the PRACH and the PUCCH, the terminal may preferentially select the PUCCH to send the communication failure recovery request to the base station, and the base station may receive the communication failure recovery request on the PUCCH. In actual application, when the second serving cell carries two or more uplink channels, the terminal may select, in another manner, a channel on which the communication failure recovery request is sent to the base station. This is not specifically limited in this embodiment.

Further, the communication failure recovery request may include an index of the first serving cell and a candidate reference signal resource indication of the first serving cell. The candidate reference signal resource indication is used to indicate a candidate reference signal port. For ease of understanding, the candidate reference signal resource indication is referred to as candidate beam information hereinafter. The candidate beam information may be downlink beam information of the second serving cell. The candidate reference signal resource indication of the first serving cell may be that the downlink beam information of the second serving cell is used as downlink beam information of the first serving cell, to recover from the communication failure of the first serving cell.

In one embodiment, the index of the first serving cell may also be an index of the first carrier, and the communication failure recovery request may include the index of the first carrier and the candidate beam information. The candidate beam information is beam information included in the second carrier, and the beam information may be information about a plurality of beams. Various potential manners of carrying the communication failure recovery request which may be used in certain embodiments are described in detail based on different uplink channels used to carry the communication failure recovery request in the second serving cell.

Manner 1: the communication failure recovery request may be carried in the following manners when the terminal sends the communication failure recovery request on a PUCCH.

(a1) The communication failure recovery request is carried by using a modulation and coding scheme, where the modulation and coding scheme may include code division multiplexing (CDM), time division multiplexing (TDM), and frequency division multiplexing (FDM). A specific coding and modulation scheme used to carry the communication failure recovery request may be preset.

In an embodiment, when the communication failure recovery request is carried in the CDM manner, this may mean that, when the terminal uses the PUCCH to carry the communication failure recovery request, the terminal modulates the communication failure recovery request by using an orthogonal sequence code, and sends the communication failure recovery request on the PUCCH. Correspondingly, when the base station receives the PUCCH, the base station uses the same orthogonal sequence code to demodulate the PUCCH to obtain the communication failure recovery request. That the communication failure recovery request is carried in the TDM manner means that, when the terminal uses the PUCCH to carry the communication failure recovery request, the terminal sends the communication failure recovery request on the PUCCH on a specified time-domain resource. Correspondingly, the base station receives the communication failure recovery request on the same time-domain resource. That the communication failure recovery request is carried in the FDM manner means that, when the terminal uses the PUCCH to carry the communication failure recovery request, the terminal sends the communication failure recovery request on the PUCCH on a specified frequency-domain resource. Correspondingly, the base station receives the communication failure recovery request on the same frequency-domain resource.

(a2) The communication failure recovery request is carried by using a specific sequence, where the specific sequence may be a reserved sequence, and the reserved sequence is a sequence that is not configured for use currently.

For ease of understanding, it is assumed that the PUCCH occupies 10 binary bits, where the first three binary bits are a reserved resource, and the fourth binary bit is an indication bit. When the indication bit is set to 1, it is indicated that the base station parses the reserved resource. Sequences corresponding to the three binary bits may include 000, 001, 010, 011, 100, 101, 110, and 111, where sequences that are currently configured for use include 000 to 110, and 111 is a reserved sequence. The terminal may configure the reserved sequence 111. In an embodiment, when an indication sequence in the PUCCH is configured to be 111, it is indicated that the PUCCH carries the communication failure recovery request. Correspondingly, when the base station receives the PUCCH, if the fourth bit is set to 1, the base station parses the first three binary bits. When a sequence corresponding to the first three binary bits is 111, it may be determined that the PUCCH carries the communication failure recovery request.

(a3) A bit is added. The communication failure recovery request is carried by using the added bit. In an embodiment, a bit occupied by the PUCCH is added, and the communication failure recovery request is carried in the added bit. Correspondingly, when the base station receives the PUCCH, the base station may obtain the communication failure recovery request from the added bit.

Manner 2: the communication failure recovery request may be carried in the following manners when the terminal sends the communication failure recovery request on a PRACH.

(b1) The communication failure recovery request is carried by using a modulation and coding scheme, where the modulation and coding scheme may include CDM, TDM, and FDM. A manner of carrying the communication failure recovery request on the PRACH by using the modulation and coding scheme is similar to the foregoing manner of the PUCCH. For details, refer to the foregoing descriptions. Details are not described herein again.

(b2) The communication failure recovery request is carried by using a specific preamble sequence, where the specific preamble sequence may be a reserved preamble sequence, and the reserved preamble sequence is a sequence that is not configured for use currently. A manner of carrying the communication failure recovery request on the PRACH by using the specific preamble sequence is similar to the foregoing manner of the PUCCH. For details, refer to the foregoing descriptions. Details are not described herein again.

Manner 3: the communication failure recovery request may be carried in the following manners when the terminal sends the communication failure recovery request on a PUSCH.

The terminal may include a media access control (MAC) layer and a physical layer, and the terminal may add the communication failure recovery request to a MAC control element (MAC-CE) at the MAC layer. The MAC-CE used to carry the communication failure recovery request may include a MAC request indication and the communication failure recovery request. The MAC request indication may also be referred to as a header of the current MAC-CE, and is used to indicate that a payload in the current MAC-CE is the communication failure recovery request.

Figure 4:
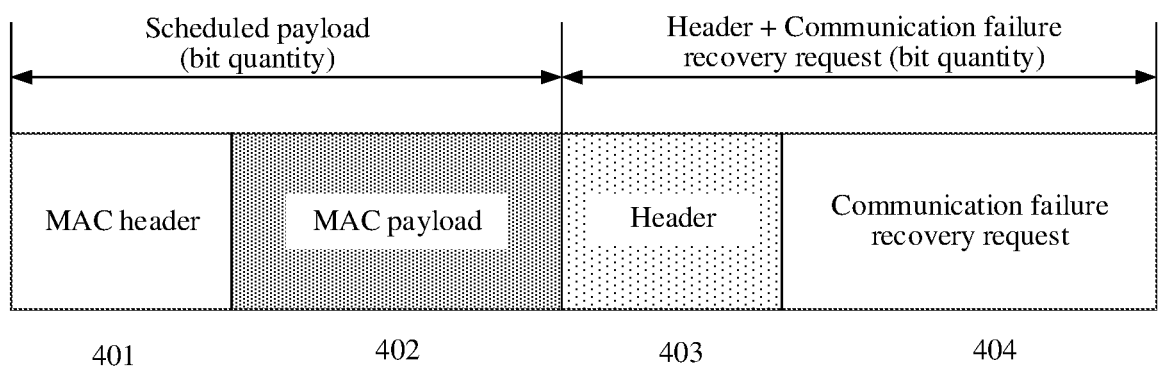
FIG. 4 is a schematic diagram of carrying a communication failure recovery request according to an embodiment.

In one embodiment, the terminal may add the communication failure recovery request to a payload that is sent to the base station. As shown in FIG. 4, the terminal may packetize, at the MAC layer, a currently scheduled payload and the communication failure recovery request (for example, the index of the first carrier and the candidate beam information). For example, the communication failure recovery request is placed after the scheduled payload or may be placed before the scheduled payload, or only the communication failure recovery request is packetized when no scheduled payload exists. The scheduled payload is the currently scheduled payload on the PUSCH. A payload obtained by the terminal after packetization at the MAC layer may be 401+402+403+404, where 401 represents a MAC header of the currently scheduled payload, 402 represents the currently scheduled payload, 403 represents a header of the communication failure recovery request, and the header in 403 is used to indicate that a payload in 404 is the communication failure recovery request. Then, the terminal sends, on the PUSCH at the physical layer, a data packet obtained through packetization to the base station. Correspondingly, when the base station receives the data packet obtained through packetization, the base station may decode the data packet at the physical layer, and depacketize the decoded data packet at the MAC layer to obtain the communication failure recovery request.

Figure 5:
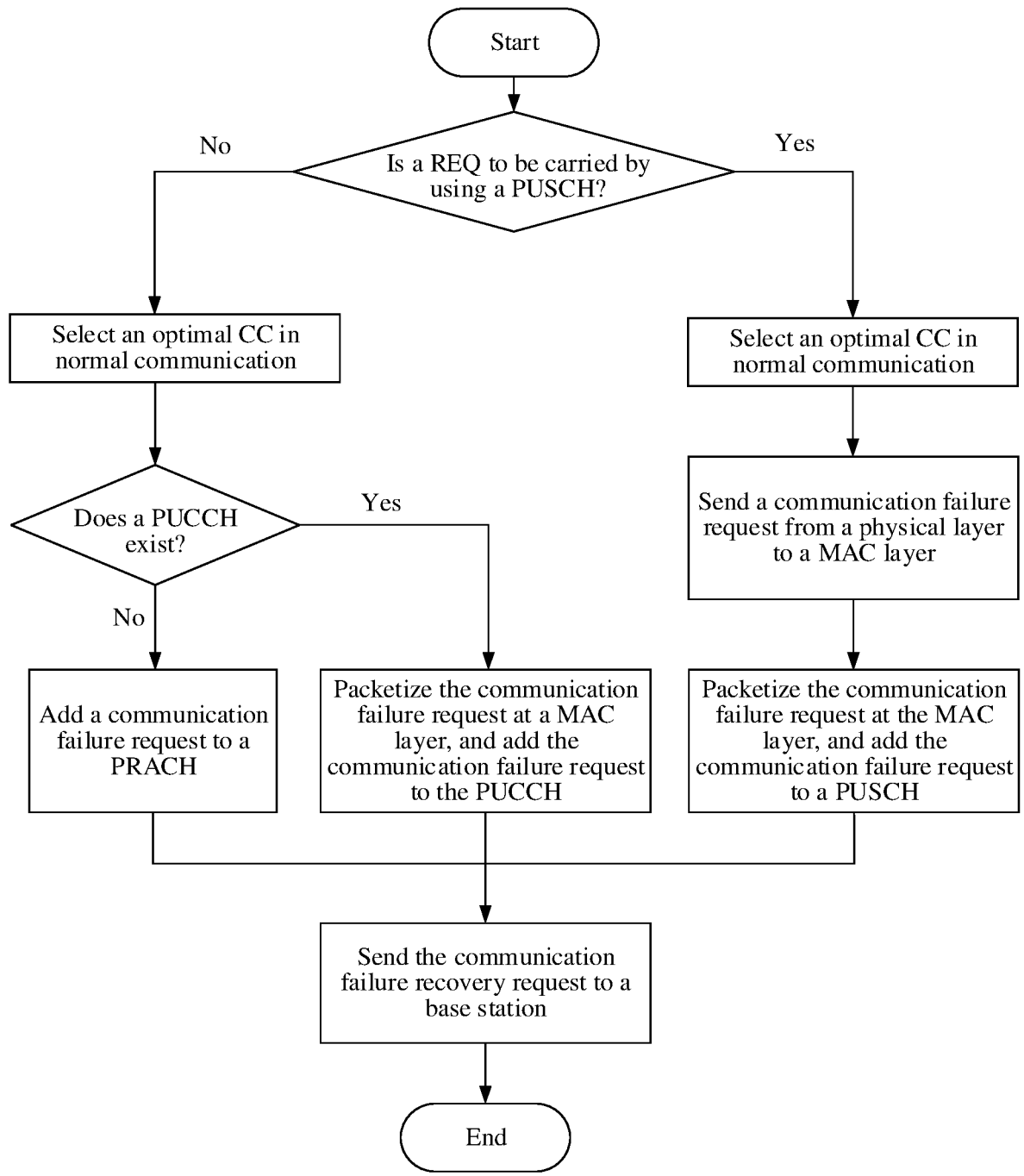
FIG. 5 is a schematic flowchart of sending a communication failure recovery request according to an embodiment.

For example, a procedure for selecting, by the terminal, a channel for carrying the communication failure recovery request may be shown in FIG. 5. The terminal first determines whether the communication failure recovery request is to be carried by using the PUSCH. If yes, the terminal selects an optimal CC in normal communication from CCs that carry a PUSCH, sends the communication failure recovery request from the physical layer of the terminal to the MAC layer, packetizes the communication failure recovery request at the MAC layer, and then adds the communication failure recovery request to the PUSCH of the selected CC. If no (that is, the terminal determines that the communication failure recovery request is not to be carried by the PUSCH), the terminal selects an optimal CC in normal communication, and determines whether a PUCCH exists on the selected CC. If the PUCCH exists, the terminal adds the communication failure recovery request to the PUCCH; or if the PUCCH does not exist, the terminal adds the communication failure recovery request to a PRACH. Then, the terminal sends the communication failure recovery request to the base station.

Alternatively, the data packet sent by the terminal to the base station on the PUSCH of the second serving cell includes indication information of the communication failure recovery request, and the indication information is used to indicate that the data packet that is sent by the terminal includes the communication failure recovery request. Correspondingly, when the data packet that is sent by the terminal and received by the base station on the PUSCH of the second serving cell includes the indication information, the base station may determine that the data packet includes the communication failure recovery request.

Step 303: the terminal detects, on a downlink channel of the second serving cell, a communication failure recovery response sent by the base station, where the communication failure recovery response is used to indicate a downlink communication resource of the first serving cell.

When the base station receives the communication failure recovery request on the downlink channel of the second serving cell, the base station may generate the communication failure recovery response based on the communication failure recovery request, and send the communication failure recovery response to the terminal on the downlink channel of the second serving cell, so that the terminal may detect the communication failure recovery response on the downlink channel of the second serving cell.

The downlink channel may include a PDCCH used to carry a control information, and a physical downlink shared channel (PDSCH) used to carry data information. In this embodiment, the terminal may detect the communication failure recovery response on any one of the foregoing downlink channels.

In addition, the communication failure recovery response is used to indicate the downlink communication resource of the first serving cell. The downlink communication resource may be a target reference signal resource indication of the first serving cell, the target reference signal resource indication is a reference signal resource indication selected by the base station, and the target reference signal resource indication is used to indicate a reference signal port.

In one embodiment, when the base station receives the communication failure request sent by the terminal, the base station may generate the communication failure recovery response and send the communication failure recovery response to the terminal. If the second serving cell carries a PDCCH, after the base station generates the communication failure recovery response, the base station may send the communication failure recovery response on the PDCCH. Correspondingly, the terminal detects, on the PDCCH, the communication failure recovery response sent by the base station. If the second serving cell carries a PDSCH, after the base station generates the communication failure recovery response, the base station may send the communication failure recovery response on the PDSCH. Correspondingly, the terminal detects, on the PDSCH, the communication failure recovery response sent by the base station. If the second serving cell carries both a PDCCH and a PDSCH, after the base station generates the communication failure recovery response, the base station may preferentially send the communication failure recovery response on the PDSCH. Correspondingly, the terminal detects, on the PDSCH, the communication failure recovery response sent by the base station.

Further, the communication failure recovery response may include the index of the first serving cell and the target reference signal resource indication of the first serving cell. The target reference signal resource indication is a reference signal resource indication selected by the base station, and the target reference signal resource indication is used to indicate a reference signal port. For ease of understanding, the target reference signal resource indication is referred to as downlink beam information hereinafter.

In one embodiment, the index of the first serving cell may also be the index of the first carrier, and the communication failure recovery response may include the index of the first carrier and the downlink beam information. The downlink beam information is downlink beam information selected by the base station from the candidate beam information included in the communication failure recovery request, and is used to indicate a downlink beam. For example, the downlink beam information may be a beam number. Various, manners of carrying the communication failure recovery response which may be employed in one or more embodiments are described in detail based on different downlink channels used to carry the communication failure recovery response in the second serving cell.

Manner I: the communication failure recovery response may be carried in the following manners when the terminal detects, on a PDCCH, the communication failure recovery response sent by the base station.

(c1) The communication failure recovery response is carried by using a modulation and coding scheme, where the modulation and coding scheme may include CDM, TDM, and FDM. A manner of carrying the communication failure recovery response on the PDCCH by using the modulation and coding scheme is similar to the manner of carrying the communication failure recovery request on the PUCCH. For details, refer to the foregoing descriptions. Details are not described herein again.

(c2) The communication failure recovery response is carried by using a specific sequence, where the specific sequence may be a reserved sequence, and the reserved sequence is a sequence that is not configured for use currently.

For ease of understanding, it is assumed that the PDCCH occupies 10 binary bits, where the first three binary bits are a reserved resource. Sequences corresponding to the three binary bits may include 000, 001, 010, 011, 100, 101, 110, and 111, where sequences that are currently configured for use include 000 to 110, and 111 is a reserved sequence. The reserved sequence 111 may be configured. In one embodiment, when an indication sequence in the PDCCH is configured to be 111, it is indicated that the PDCCH carries the communication failure recovery response. Correspondingly, when the terminal receives the PDCCH across carriers, the terminal may parse the reserved resource of the PDCCH. If the corresponding sequence in the reserved resource is 111, the terminal may determine that the PDCCH carries the communication failure recovery response.

(c3) A bit is added. The communication failure recovery response is carried by using the added bit. In one embodiment, a bit occupied by the PDCCH is added, and the communication failure recovery response is carried in the added bit. Correspondingly, when the terminal detects the PDCCH, the terminal may obtain the communication failure recovery response from the added bit.

Manner II: the communication failure recovery response may be carried in the following manners when the terminal detects, on a PDSCH, the communication failure recovery response sent by the base station.

The base station may include a MAC layer and a physical layer, and the base station may use a MAC-CE to carry the communication failure recovery response. The MAC-CE used to carry the communication failure recovery response may include a MAC response indication and the communication failure recovery response. The MAC response indication may also be referred to as a header of the current MAC-CE, and is used to indicate that a payload in the current MAC-CE is the communication failure recovery response.

Figure 6:
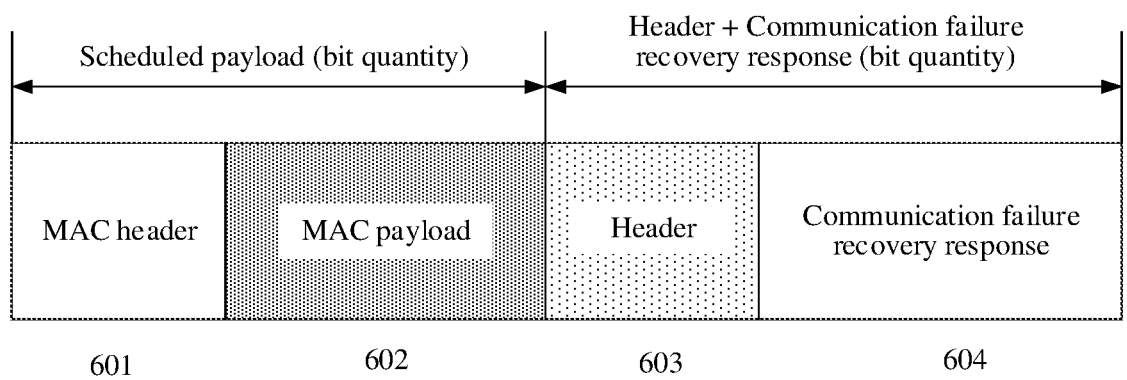
FIG. 6 is a schematic diagram of carrying a communication failure recovery response according to an embodiment.

In one embodiment, the base station may add the communication failure recovery response to a payload that is sent to the terminal. As shown in FIG. 6, the base station may packetize, at the MAC layer, a currently scheduled payload and the communication failure recovery response (for example, the index of the first carrier and the downlink beam information). For example, the communication failure recovery response is placed after the payload or may be placed before the payload. Alternatively, only the communication failure recovery response is packetized when no payload exists. The scheduled payload is the currently scheduled payload on the PDSCH. A payload obtained by the base station after packetization at the MAC layer may be 601+602+603+604, where 601 represents a MAC header of the currently scheduled payload, 602 represents the currently scheduled payload, 603 represents a header of the communication failure recovery response, and the header in 603 is used to indicate that a payload in 604 is the communication failure recovery response. Then, the base station sends, to the terminal on the PDSCH at the physical layer, a data packet obtained through packetization. Correspondingly, when the terminal detects, on the PDSCH, the data packet obtained through packetization, the terminal may decode the data packet at the physical layer, and depacketize the decoded data packet at the MAC layer to obtain the communication failure recovery response. Further, the terminal may determine a corresponding downlink beam based on downlink beam information included in the communication failure recovery response, to determine that the base station sends information by using the downlink beam, thereby implementing fast communication failure recovery.

Figure 7:
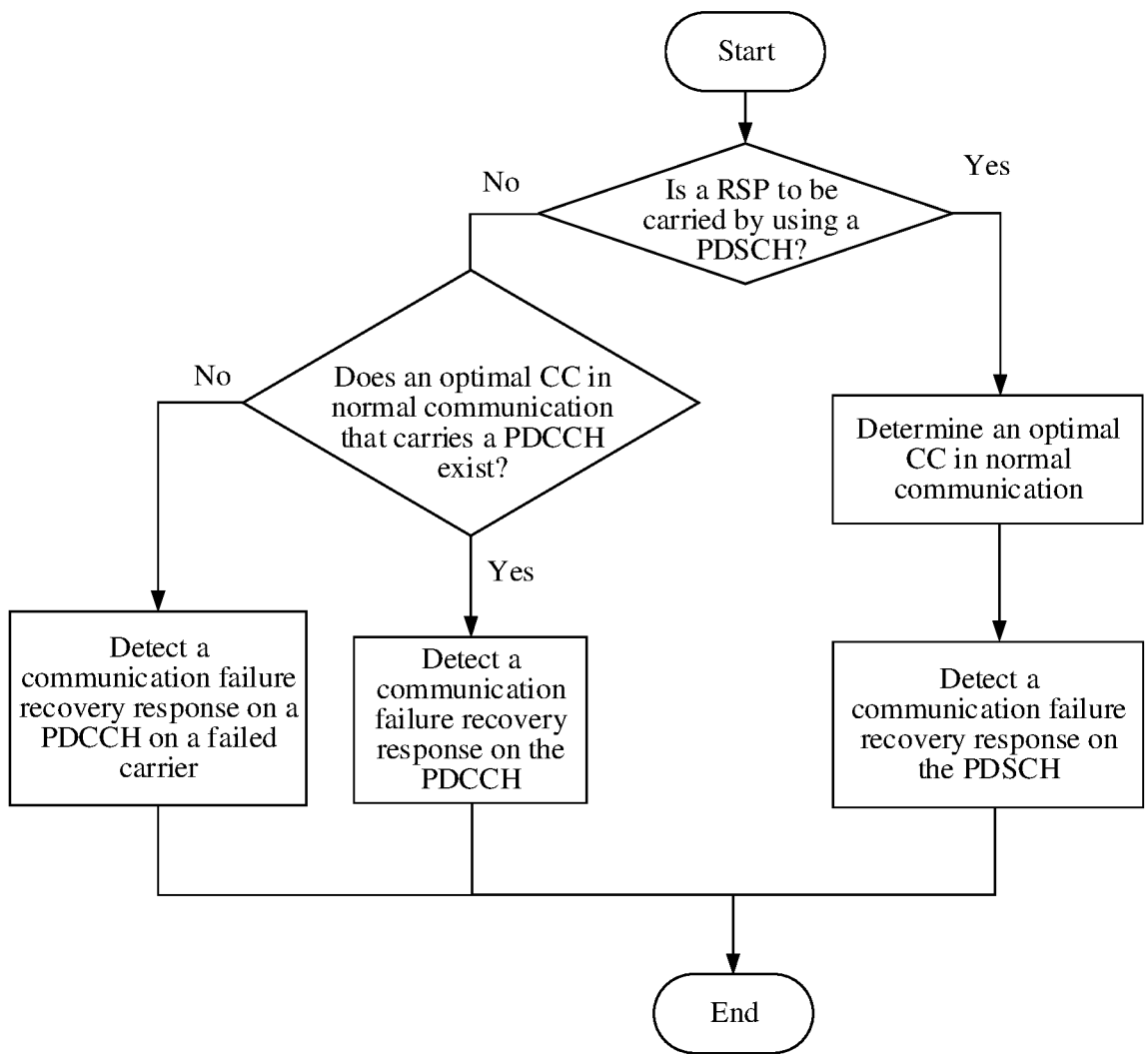
FIG. 7 is a schematic flowchart of detecting a communication failure recovery response according to an embodiment.

For example, a procedure for selecting, by the terminal, a channel for detecting the communication failure recovery response may be shown in FIG. 7. The terminal first determines whether to detect the communication failure recovery response on a PDSCH. If yes, the terminal selects an optimal CC in normal communication from CCs, and then detects the communication failure recovery response on the PDSCH. If no (that is, the terminal determines not to detect the communication failure recovery response on the PDSCH), the terminal determines whether an optimal CC in normal communication that carries a PDCCH exists. If the optimal CC exists, the terminal detects the communication failure recovery response on the PDCCH. If the optimal CC does not exist, the terminal detects the communication failure recovery response on a PDCCH of a failed carrier. (An embodiment of a specific process for this may be provided in step 304 to step 306).

Alternatively, the data packet that is sent by the base station to the terminal on the PDCCH of the second serving cell includes indication information of the communication failure recovery response. The indication information is used to indicate that the data packet sent by the base station includes the communication failure recovery response. Correspondingly, when the terminal detects the data packet that is sent by the base station on the PDCCH of the second serving cell, the terminal determines, based on the indication information of the communication failure recovery response included in the data packet, that the data packet includes the communication failure recovery response.

Further, for ease of understanding, an example in which the base station provides a CA service for the terminal by using two serving cells is used herein to describe a beam failure recovery procedure. It is assumed that the two serving cells are a serving cell X and a serving cell Y, a CC corresponding to the serving cell X is a first carrier, and a CC corresponding to the serving cell Y is a second carrier. For the first carrier, the terminal uses a beam a1 and a beam a2, and the base station uses a beam a3 and a beam a4. The beam a1 and the beam a3 are one beam pair, and the beam a2 and the beam a4 are one beam pair (assuming that the terminal uses the beam a1 to carry a PRACH/PUCCH, and the terminal uses the beam a2 to carry a CSI-RS/SS block and a PDCCH). For the second carrier, the terminal uses a beam c1 and a beam c2, and the base station uses a beam c3 and a beam c4. The beam c1 and the beam c3 are one beam pair, and the beam c2 and the beam c4 are one beam pair (assuming that the terminal uses the beam c1 to carry a PRACH/PUCCH and a PUSCH, and the terminal uses the beam c2 to carry a CSI-RS/SS block, a PDCCH, and a PDSCH).

In one embodiment, when the terminal detects, on the CSI-RS/SS block carried on the beam a2, that a beam failure occurs in the first serving cell, if the terminal determines that the second serving cell is in normal communication, the terminal may use information about a plurality of downlink beams (for example, a beam b3 and a beam b4) configured on the second carrier as candidate beam information, and send the communication failure recovery request on an uplink channel (for example, the PRACH/PUCCH or the PUSCH carried on the beam c1) of the second serving cell, where the communication failure recovery request includes an index of the first carrier and the information about the beam c3 and the beam c4. When the base station receives the communication failure recovery request sent by the terminal, the base station may select the beam c3 as a downlink beam over which the base station sends the communication failure recovery response, and send, to the terminal, the information about the beam 3 by using the communication failure recovery response. When the terminal detects the communication failure recovery response on the downlink channel (for example, the PDCCH or the PDSCH carried on the beam c2) of the second serving cell, the terminal may determine that the base station uses the beam c3 to send information, and further use the beam c1 in the same beam pair to receive the information sent by the base station.

In this embodiment, when the terminal detects that the downlink communication failure occurs in the first serving cell, the terminal determines that downlink communication of the second serving cell is normal, sends the communication failure recovery request of the first serving cell on the uplink channel of the second serving cell, and detects the communication failure recovery response on the downlink channel of the second serving cell, without performing beam sweeping on a carrier corresponding to the first serving cell to obtain candidate beam information. This saves a beam sweeping time. In addition, the second serving cell is a serving cell in normal communication, the communication failure recovery request is sent on the uplink channel of the second serving cell, and the communication failure recovery response is detected on the downlink channel of the second serving cell. In comparison with a case of directly performing communication failure recovery on a serving cell with a communication failure, this can increase a communication failure recovery success rate, and further implement fast communication failure recovery.

Figure 8:
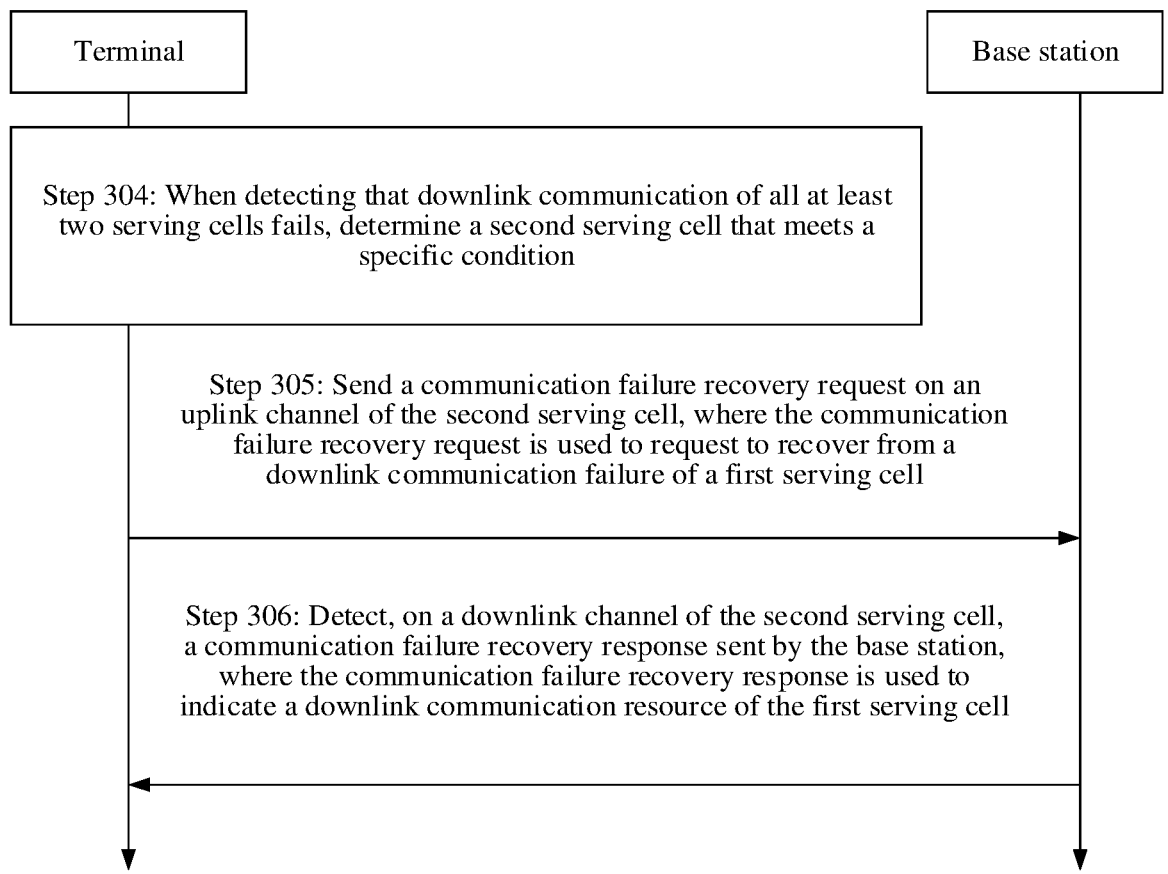
FIG. 8 is a schematic flowchart of another wireless communication method according to an embodiment.

Further, referring to FIG. 8, when the terminal detects that downlink communication of all the at least two serving cells fails, the terminal may perform recovery from the downlink communication failure of the first serving cell by using a better serving cell of the at least two serving cells. Details are described as follows.

Step 304: When the terminal detects that downlink communication of all the at least two serving cells fails, the terminal determines that the second serving cell meets a specific condition, where the specific condition includes at least one of the following conditions: an index of the second serving cell is the smallest, channel quality of a downlink channel of the second serving cell is the best, and a carrier frequency corresponding to the second serving cell is the lowest.

In one embodiment, when no serving cell is in normal communication in the at least two serving cells, that is, when the terminal determines that downlink communication of all the at least two serving cells fails, the terminal may select a better serving cell from the at least two serving cells with communication failures. It is assumed herein that the second serving cell is the better serving cell. For example, in the at least two serving cells, the index of the second serving cell is the smallest, the carrier frequency corresponding to the second serving cell is the lowest, or the downlink channel quality of the second serving cell is the best in the at least two serving cells. In actual application, the second serving cell may be a serving cell selected in another manner, to improve communication failure recovery efficiency. This is not specifically limited in this embodiment.

It can be noted that, when the at least two serving cells include three or more serving cells, each of the at least two serving cells except for the first serving cell may be referred to as the second serving cell. In other words, the at least two serving cells may include a plurality of second serving cells, and therefore the second serving cell that meets the specific condition may be a second serving cell selected from the plurality of second serving cells.

Step 305: the terminal sends the communication failure recovery request to the base station on the uplink channel of the second serving cell.

Step 306: the terminal detects, on the downlink channel of the second serving cell, the communication failure recovery response sent by the base station.

It can be noted that, the process of sending the communication failure recovery request to the base station by the terminal on the uplink channel of the second serving cell is consistent with the process of sending the communication failure recovery request to the base station on the uplink channel of the second serving cell in step 302, and the process of detecting, by the terminal on the downlink channel of the second serving cell, the communication failure recovery response sent by the base station is also consistent with the process of detecting, by the terminal on the downlink channel of the second serving cell, the communication failure recovery response sent by the base station in step 303. For details, refer to the descriptions in step 302 and step 303. Details are not described herein again in this embodiment.

In this embodiment, in comparison with the case of carrying a communication failure recovery procedure directly by using the first serving cell, when all the at least two serving cells have communication failures, the terminal selects the better second serving cell to carry the communication failure recovery procedure. To some extent, this can also increase a communication failure recovery success rate, and further improve recovery efficiency.

Further, before the terminal sends the communication failure recovery request, the base station may further configure an uplink channel on which the communication failure recovery request is sent. This process may, in one embodiment, include steps of: the base station sends communication failure recovery request configuration information to the terminal, where the failure recovery request configuration information is used to indicate the uplink channel on which the communication failure recovery request is sent, and the uplink channel is one of the following channels: a PUCCH, a PRACH, and a PUSCH. Correspondingly, the terminal receives the failure recovery request configuration information from the base station. Therefore, when the terminal sends the communication failure recovery request, the terminal may send the communication failure recovery request on the corresponding uplink channel based on the failure recovery request configuration information.

Further, before the terminal detects the communication failure recovery response, the base station may further configure a downlink channel on which the communication failure recovery response is detected. This process may, in one embodiment, include steps of: the base station sends communication failure recovery response configuration information to the terminal, where the failure recovery response configuration information is used to indicate the downlink channel on which the communication failure recovery response is detected, and the downlink channel is one of the following channels: a physical downlink control channel and a physical downlink shared channel. Correspondingly, the terminal receives the failure recovery response configuration information from the base station. Therefore, when the terminal detects the communication failure recovery response sent by the base station, the terminal may detect the communication failure recovery response on the corresponding downlink channel based on the failure recovery response configuration information.

Further, the terminal may further report, to the base station, a capability of the terminal. For example, the terminal has one or more of the following capabilities: a capability of sending the communication failure recovery request across carriers (for example, when the first serving cell fails, the terminal uses the second serving cell to carry a communication failure recovery mechanism of the first serving cell), a capability of adding the communication failure recovery request to a PUSCH (for example, the terminal sends the communication failure recovery request on the PUSCH of the second serving cell), and a capability of detecting the communication failure recovery response on a PDSCH (for example, the terminal detects the communication failure recovery response on the PDSCH of the second serving cell). After the base station receives capability information reported by the terminal, the base station may send corresponding configuration information to the terminal, to instruct the terminal to use one or more of the capabilities.

In one embodiment, the terminal may send first indication information to the base station, where the first indication information is used to indicate that the terminal has the capability of sending a communication failure recovery request across carriers. Alternatively, the terminal may send second indication information to the base station, where the second indication information is used to indicate that the terminal may add a communication failure recovery request to the PUSCH. Alternatively, the terminal may send third indication information to the base station, where the third indication information is used to indicate that the terminal may detect the communication failure recovery response by using the PDSCH. In actual application, the terminal may report a plurality of capabilities of the terminal to the base station at a time. For example, the terminal may report any two of the foregoing three capabilities to the base station at a time, or report the foregoing three capabilities to the base station at a time. This is not specifically limited in this embodiment.

The foregoing mainly describes the solutions provided in the embodiments described herein from a perspective of interaction between network elements. It may be understood that the network elements may be, for example, a terminal and a base station. To implement the foregoing functions, the network elements include corresponding hardware structures and/or software modules for performing functions. A person of ordinary skill in the art should easily be aware that, with reference to the examples described in the embodiments disclosed in this specification, units, algorithms steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this disclosure.

In embodiments such as are described herein, functional modules of the terminal and the base station may be obtained through division according to the foregoing method examples. For example, the functional modules may be obtained through division based on the corresponding functions, or at least two functions may be integrated in one module. The integrated module may be implemented in a form of hardware, or may be implemented in a form of a software functional module. It may be noted that, in the embodiments described herein, module division is an example, and is merely logical function division. In actual implementation, another division manner may be used. The following uses an example that the functional modules are obtained through division based on the functions for description.

Figure 9:
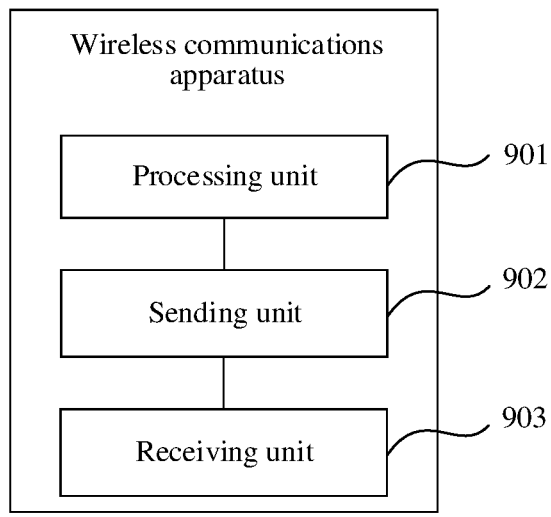
FIG. 9 is a schematic structural diagram of a wireless communications apparatus according to an embodiment.

In the case of using an integrated unit, FIG. 9 is a schematic diagram of a possible structure of a wireless communications apparatus used in the foregoing embodiment. The wireless communications apparatus may be a terminal or a chip used in a terminal, and the wireless communications apparatus includes a processing unit 901, a sending unit 902, and a receiving unit 903. The processing unit 901 is configured to support the wireless communications apparatus in performing step 301 or step 304 in the foregoing embodiments, and/or is configured to execute another process of the technology described in this specification. The sending unit 902 is configured to support the wireless communications apparatus in performing step 302 or step 305 in the foregoing embodiments. The receiving unit 903 supports the wireless communications apparatus in performing step 303 or step 306 in the foregoing embodiments. All related content of the steps in the foregoing method embodiments may be cited in function descriptions of the corresponding function modules. Details are not described herein again.

Based on hardware implementation, the processing unit 901 described herein may be a processor of the wireless communications apparatus, the sending unit 902 may be a transmitter of the wireless communications apparatus, and the receiving unit 903 may be a receiver of the wireless communications apparatus. The transmitter and the receiver may be usually integrated together to serve as a transceiver. The transceiver may also be referred to as a communications interface.

Figure 10:
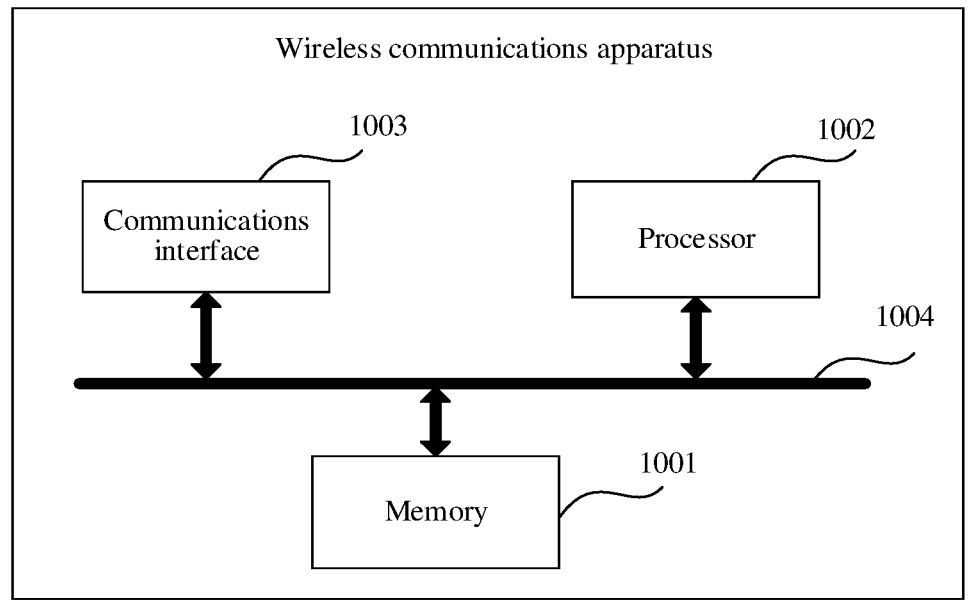
FIG. 10 is a schematic structural diagram of another wireless communications apparatus according to an embodiment.

FIG. 10 is a schematic diagram of a possible logical structure of a wireless communications apparatus used in the foregoing embodiment, according to an embodiment such as described herein. The wireless communications apparatus may be a terminal or a chip used in a terminal, and the wireless communications apparatus includes a processor 1002 and a communications interface 1003. The processor 1002 is configured to control and manage an action of the wireless communications apparatus. For example, the processor 1002 is configured to support the wireless communications apparatus in performing step 301 and step 304 in the foregoing embodiment, and/or is configured to execute another process of the technology described herein. In addition, the wireless communications apparatus may further include a memory 1001 and a bus 1004. The processor 1002, the communications interface 1003, and the memory 1001 are connected to each other by using the bus 1004. The communications interface 1003 is configured to support the wireless communications apparatus in performing communication. The memory 1001 is configured to store program code and data of the wireless communications apparatus.

The processor 1002 may be a central processing unit, a general-purpose processor, a digital signal processor, an application-specific integrated circuit, a field programmable gate array, another programmable logic device, a transistor logic device, a hardware component, or any combination thereof. The processor 1002 may implement or execute various example logical blocks, modules, and circuits described with reference to content disclosed herein. Alternatively, the processor may be a combination of processors implementing a computing function, for example, a combination of one or more microprocessors, or a combination of a digital signal processor and a microprocessor. The bus 1004 may be a peripheral component interconnect (PCI) bus, an extended industry standard architecture (EISA) bus, or the like. The bus may be classified into an address bus, a data bus, a control bus, and the like. For ease of indication, the bus is indicated by using only one bold line in FIG. 10. However, it does not indicate that there is only one bus or only one type of bus.

Figure 11:
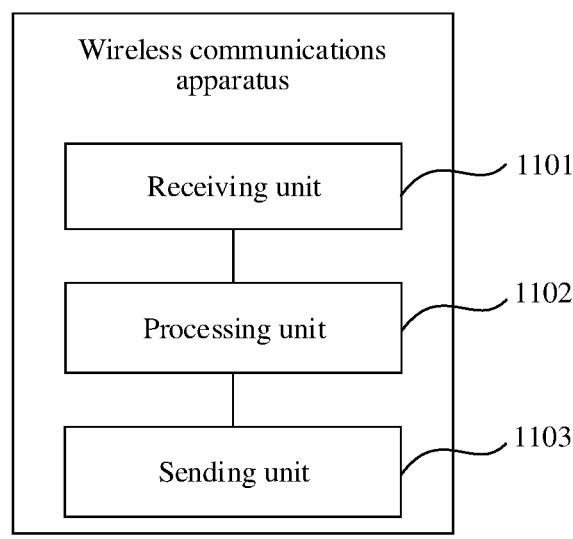
FIG. 11 is a schematic structural diagram of still another wireless communications apparatus according to an embodiment.

In the case of using an integrated unit, FIG. 11 is a schematic diagram of a possible structure of a wireless communications apparatus used in the foregoing embodiment. The wireless communications apparatus may be a base station or a chip used in a base station, and the wireless communications apparatus includes a receiving unit 1101, a processing unit 1102, and a sending unit 1103. The receiving unit 1101 is configured to support the wireless communications apparatus in receiving the communication failure recovery request sent in step 302 or receiving the communication failure recovery request sent in step 305 in the foregoing embodiment. The processing unit 1102 is configured to support the wireless communications apparatus in performing the step of generating a communication failure recovery response in the foregoing embodiment, and/or is configured to execute another process of the technology described in this specification. The sending unit 1103 supports the wireless communications apparatus in performing the step of sending a communication failure recovery response to the terminal in the foregoing embodiment. All related content of the steps in the foregoing method embodiments may be cited in function descriptions of the corresponding function modules. Details are not described herein again.

Based on hardware implementation, the processing unit 1102 described herein may be a processor of the wireless communications apparatus, the receiving unit 1101 may be a receiver of the wireless communications apparatus, and the sending unit 1103 may be a transmitter of the wireless communications apparatus. The transmitter and the receiver may be usually integrated together to serve as a transceiver. The transceiver may also be referred to as a communications interface.

Figure 12:
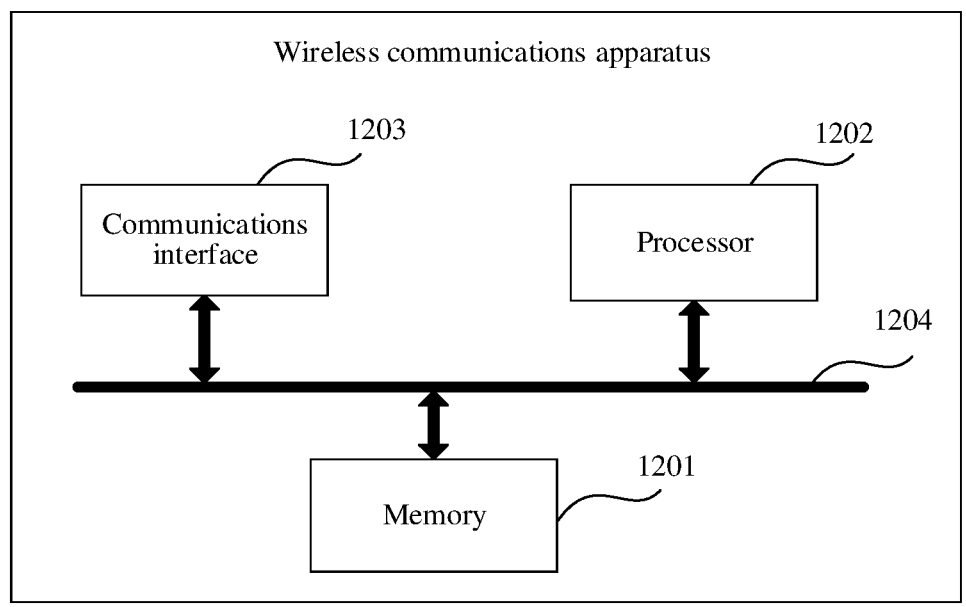
FIG. 12 is a schematic structural diagram of yet another wireless communications apparatus according to an embodiment.

FIG. 12 is a schematic diagram of a possible logical structure of a wireless communications apparatus used in the foregoing embodiment according to an embodiment. The wireless communications apparatus may be a base station or a chip used in a base station, and the wireless communications apparatus includes a processor 1202 and a communications interface 1203. The processor 1202 is configured to control and manage an action of the wireless communications apparatus. For example, the processor 1202 is configured to support the wireless communications apparatus in performing the step of generating a communication failure recovery response, and/or is configured to execute another process of the technology described in this specification. In addition, the wireless communications apparatus may further include a memory 1201 and a bus 1204. The processor 1202, the communications interface 1203, and the memory 1201 are connected to each other by using the bus 1204. The communications interface 1203 is configured to support the wireless communications apparatus in performing communication. The memory 1201 is configured to store program code and data of the wireless communications apparatus.

The processor 1202 may be a central processing unit, a general-purpose processor, a digital signal processor, an application-specific integrated circuit, a field programmable gate array, another programmable logic device, a transistor logic device, a hardware component, or any combination thereof. The processor 1202 may implement or execute various example logical blocks, modules, and circuits described with reference to content disclosed herein. Alternatively, the processor may be a combination of processors implementing a computing function, for example, a combination of one or more microprocessors, or a combination of a digital signal processor and a microprocessor. The bus 1204 may be a PCI bus, an EISA bus, or the like. The bus may be classified into an address bus, a data bus, a control bus, and the like. For ease of representation, the bus is indicated by using only one bold line in FIG. 12, but this does not mean that there is only one bus or only one type of bus.

In another embodiment, a readable storage medium is further provided. The readable storage medium stores a computer-executable instruction. When the computer-executable instruction is executed, a device (which may be a single-chip microcomputer, a chip, or the like) or a processor is enabled to perform the steps of the terminal in the wireless communication method provided in the foregoing method embodiment. The foregoing readable storage medium may include any medium that can store program code, such as a USB flash drive, a removable hard disk, a read-only memory, a random access memory, a magnetic disk, or an optical disc.

In another embodiment, a readable storage medium is further provided. The readable storage medium stores a computer-executable instruction. When the computer-executable instruction is executed, a device (which may be a single-chip microcomputer, a chip, or the like) or a processor is enabled to perform the steps of the base station in the wireless communication method provided in the foregoing method embodiment. The foregoing readable storage medium may include any medium that can store program code, such as a USB flash drive, a removable hard disk, a read-only memory, a random access memory, a magnetic disk, or an optical disc.

In another embodiment, a computer program product is further provided. The computer program product includes a computer-executable instruction. The computer-executable instruction is stored in a computer-readable storage medium. At least one processor of a device may read the computer-executable instruction from the computer-readable storage medium. The at least one processor executes the computer-executable instruction to enable the device to perform the steps of the terminal in the wireless communication method provided in the method embodiment.

In another embodiment, a computer program product is further provided. The computer program product includes a computer-executable instruction. The computer-executable instruction is stored in a computer-readable storage medium. At least one processor of a device may read the computer-executable instruction from the computer-readable storage medium. The at least one processor executes the computer-executable instruction to enable the device to perform the steps of the base station in the wireless communication method provided in the method embodiment.

In another embodiment, a communications system is further provided. The communications system includes a base station and a terminal. The base station provides a CA service for the terminal by using at least two serving cells, and the at least two serving cells include a first serving cell and a second serving cell. The terminal or a chip used in the terminal may be the wireless communications apparatus provided in FIG. 9 or FIG. 10, and is configured to perform the steps of the terminal in the foregoing method embodiment; and/or the base station or a chip used in the base station may be the wireless communications apparatus provided in FIG. 11 or FIG. 12, and is configured to perform the steps of the base station in the foregoing method embodiment.

In the embodiments described herein, when the terminal detects that the downlink communication failure occurs in the first serving cell, the terminal determines that downlink communication of the second serving cell is normal, sends the communication failure recovery request of the first serving cell on the uplink channel of the second serving cell, and detects the communication failure recovery response on the downlink channel of the second serving cell, without performing beam sweeping on the carrier corresponding to the first serving cell to obtain the candidate beam information. This saves a beam sweeping time. In addition, the second serving cell is a serving cell in normal communication, the communication failure recovery request is sent on the uplink channel of the second serving cell, and the communication failure recovery response is detected on the downlink channel of the second serving cell. In comparison with a procedure of directly performing communication failure recovery on a serving cell with a communication failure, this can increase a communication failure recovery success rate, and further implement fast communication failure recovery.

Finally, it can be noted that the foregoing descriptions are merely implementations of this application, but are not intended to limit the protection scope of this application. Any variation or replacement within the technical scope disclosed in this application shall fall within the protection scope of this application.

What is claimed is:

1. A wireless communication method, using a terminal or a chip used in a terminal, wherein a base station provides a carrier aggregation service for the terminal by using at least two serving cells, wherein the at least two serving cells comprise a first serving cell and a second serving cell, and the method comprises:
   detecting that downlink communication of the first serving cell fails;
   upon detecting that downlink communication of the first serving cell fails, determining that downlink communication of the second serving cell is normal;
   sending a communication failure recovery request on an uplink channel of the second serving cell, the communication failure recovery request indicating a request to recover from a downlink communication failure of the first serving cell, wherein the communication failure recovery request comprises an index of the first serving cell and a candidate reference signal resource indication of the first serving cell;
   detecting a communication failure recovery response on a downlink channel of the second serving cell, the communication failure recovery response indicating a downlink communication resource of the first serving cell;
   wherein the terminal selects, from the serving cells in normal communication, a serving cell having the best channel quality of a downlink channel as of the second serving cell, if there are a plurality of serving cells in normal communication.

2. The wireless communication method according to claim 1, wherein the method further comprises performing, before sending the communication failure recovery request, a step of:
   receiving failure recovery request configuration information from the base station, the failure recovery request configuration information indicating the uplink channel on which the communication failure recovery request is sent, and the uplink channel is one of the following channels: a physical uplink control channel, a physical random access channel, and a physical uplink shared channel.

3. The wireless communication method according to claim 1, wherein the uplink channel on which the communication failure recovery request is sent is a physical uplink shared channel.

4. The wireless communication method according to claim 1, wherein the method further comprises performing, before detecting the communication failure recovery response, a step of:
   receiving failure recovery response configuration information from the base station, the failure recovery response configuration information indicating the downlink channel on which the communication failure recovery response is detected, wherein the downlink channel is one of the following channels: a physical downlink control channel and a physical downlink shared channel.

5. The wireless communication method according to claim 1, wherein the downlink channel on which the communication failure recovery response is detected is a physical downlink control channel.

6. The wireless communication method according to claim 1, wherein the method further comprises:
   detecting that downlink communication of all of the at least two serving cells fails, and, upon detecting that downlink communication of all of the at least two serving cells fails, determining that the second serving cell meets at least one of the following conditions: an index of the second serving cell is the smallest, channel quality of a downlink channel of the second serving cell is the best, and a carrier frequency corresponding to the second serving cell is the lowest.

7. A wireless communications apparatus comprising one of: a terminal or a chip used in a terminal, the wireless communications apparatus configured to receive, from a base station, a carrier aggregation service for the terminal, the base station configured to provide the carrier aggregation service by using at least two serving cells, the at least two serving cells comprising a first serving cell and a second serving cell, wherein the wireless communications apparatus comprises:
   a transceiver;
   at least one processor; and
      one or more memories coupled to the at least one processor and storing programming instructions for execution by the at least one processor to cause the apparatus to:
   detect that downlink communication of the first serving cell fails, and, upon detecting that downlink communication of the first serving cell fails, determine that downlink communication of the second serving cell is normal;
   send a communication failure recovery request on an uplink channel of the second serving cell, the communication failure recovery request indicating a request to recover from a downlink communication failure of the first serving cell, wherein the communication failure recovery request comprises an index of the first serving cell and a candidate reference signal resource indication of the first serving cell;
   detect a communication failure recovery response on a downlink channel of the second serving cell, the communication failure recovery response indicating a downlink communication resource of the first serving cell;
   wherein the terminal selects, from the serving cells in normal communication, a serving cell having the best channel quality of a downlink channel as the second serving cell, if there are a plurality of serving cells in normal communication of the second serving cell.

8. The wireless communications apparatus according to claim 7, wherein
   the programming instructions, when executed by the at least one processor, further cause the apparatus to receive failure recovery request configuration information from the base station, the failure recovery request configuration information indicating the uplink channel on which the communication failure recovery request is sent, and the uplink channel is one of the following channels: a physical uplink control channel, a physical random access channel, and a physical uplink shared channel.

9. The wireless communications apparatus according to claim 7, wherein the uplink channel on which the communication failure recovery request is sent is a physical uplink shared channel.

10. The wireless communications apparatus according to claim 7, wherein
the programming instructions, when executed by the at least one processor, further cause the apparatus to receive failure recovery response configuration information from the base station, the failure recovery response configuration information indicating the downlink channel on which the communication failure recovery response is detected, and the downlink channel is one of the following channels: a physical downlink control channel and a physical downlink shared channel.

11. The wireless communications apparatus according to claim 7, wherein the downlink channel on which the communication failure recovery response is detected is a physical downlink control channel.

12. The wireless communications apparatus according to claim 7, wherein the programming instructions, when executed by the at least one processor, further cause the apparatus to:
detect that downlink communication of all of the at least two serving cells fails, and, upon detecting that downlink communication of all of the at least two serving cells fails,
determine that the second serving cell meets at least one of the following conditions: an index of the second serving cell is the smallest, channel quality of a downlink channel of the second serving cell is the best, and a carrier frequency corresponding to the second serving cell is the lowest.

13. A wireless communications apparatus comprising one of: a base station or a chip used in a base station, wherein the base station provides a carrier aggregation service for a terminal by using at least two serving cells, the at least two serving cells comprising a first serving cell and a second serving cell, wherein the wireless communications apparatus comprises:
a transceiver;
at least one processor; and
one or more memories coupled to the at least one processor and storing programming instructions for execution by the at least one processor to cause the apparatus to:
receive a communication failure recovery request from the terminal on an uplink channel of the second serving cell, the communication failure recovery request indicating a request to recover from a downlink communication failure of the first serving cell, wherein the communication failure recovery request comprises an index of the first serving cell and a candidate reference signal resource indication of the first serving cell;
generate a communication failure recovery response, the communication failure recovery response indicating a downlink communication resource of the first serving cell; and
send the communication failure recovery response to the terminal on a downlink channel of the second serving cell;
select, from the serving cells in normal communication, a serving cell having the best channel quality of a downlink channel as the second serving cell, if there are a plurality of serving cells in normal communication.

14. The wireless communications apparatus according to claim 13, wherein the programming instructions, when executed by the at least one processor, further cause the apparatus to
send failure recovery request configuration information to the terminal, the failure recovery request configuration information indicating the uplink channel on which the communication failure recovery request is sent, and the uplink channel is one of the following channels: a physical uplink control channel, a physical random access channel, and a physical uplink shared channel.

15. The wireless communications apparatus according to claim 13, wherein the uplink channel on which the communication failure recovery request is received is a physical uplink shared channel.

16. The wireless communications apparatus according to claim 13, wherein the programming instructions, when executed by the at least one processor, further cause the apparatus to
send failure recovery response configuration information to the terminal, the failure recovery response configuration information indicating the downlink channel on which the communication failure recovery response is detected, and the downlink channel is one of the following channels: a physical downlink control channel and a physical downlink shared channel.

17. The wireless communications apparatus according to claim 13, wherein the downlink channel on which the communication failure recovery response is sent is a physical downlink control channel.

18. A non-transitory computer-readable storage medium, wherein the non-transitory computer-readable storage medium stores a computer program for execution by a processor of a terminal device, wherein a base station provides a carrier aggregation service for the terminal by using at least two serving cells, wherein the at least two serving cells comprise a first serving cell and a second serving cell, the program including instructions for:
detecting that downlink communication of the first serving cell fails, and, upon detecting that downlink communication of the first serving cell fails, determining that downlink communication of the second serving cell is normal;
sending a communication failure recovery request on an uplink channel of the second serving cell, the communication failure recovery request indicating a request to recover from a downlink communication failure of the first serving cell, wherein the communication failure recovery request comprises an index of the first serving cell and a candidate reference signal resource indication of the first serving cell; and
detecting a communication failure recovery response on a downlink channel of the second serving cell, the communication failure recovery response indicating a downlink communication resource of the first serving cell;
wherein the program further includes instructions for:
selecting, from the serving cells in normal communication, a serving cell having the best channel quality of a downlink channel as the second serving cell, if there are a plurality of serving cells in normal communication.

19. The non-transitory computer-readable storage medium according to claim 18, wherein the uplink channel on which the communication failure recovery request is sent is a physical uplink shared channel.

20. The non-transitory computer-readable storage medium according to claim 18, wherein the downlink channel on which the communication failure recovery response is detected is a physical downlink control channel.

21. A non-transitory computer-readable storage medium, wherein the non-transitory computer-readable storage medium stores a computer program for execution by a processor of a base station, wherein the base station provides a carrier aggregation service for a terminal by using at least two serving cells, wherein the at least two serving cells comprise a first serving cell and a second serving cell, the program including instructions for:

receiving a communication failure recovery request from the terminal on an uplink channel of the second serving cell, the communication failure recovery request indicating a request to recover from a downlink communication failure of the first serving cell, wherein the communication failure recovery request comprises an index of the first serving cell and a candidate reference signal resource indication of the first serving cell; and generating a communication failure recovery response, the communication failure recovery response indicating a downlink communication resource of the first serving cell; and sending the communication failure recovery response to the terminal on a downlink channel of the second serving cell;

selecting from the serving cells in normal communication, a serving cell having the best channel quality of a downlink channel as the second serving cell, if there are a plurality of serving cells in normal communication.

22. The non-transitory computer-readable storage medium according to claim 21, wherein the uplink channel on which the communication failure recovery request is received is a physical uplink shared channel.

23. The non-transitory computer-readable storage medium according to claim 21, wherein the downlink channel on which the communication failure recovery response is sent is a physical downlink control channel.

* * * * *

UNITED STATES PATENT AND TRADEMARK OFFICE
CERTIFICATE OF CORRECTION

| | | |
|---|---|---|
| PATENT NO. | : 11,924,901 B2 | Page 1 of 1 |
| APPLICATION NO. | : 16/778105 | |
| DATED | : March 5, 2024 | |
| INVENTOR(S) | : Juhua Xue et al. | |

It is certified that error appears in the above-identified patent and that said Letters Patent is hereby corrected as shown below:

On the Title Page

Under (71) Applicant:
"HUAWEI TECHNOLOGIES CO., LTD., Shenzhen (CN)";
Should be:
"BEJING JINGSHI INTELLECTUAL PROPERTY MANAGEMENT CO., LTD., Beijing (CN)"

Signed and Sealed this
Eighth Day of October, 2024

Katherine Kelly Vidal
*Director of the United States Patent and Trademark Office*